(12) United States Patent
Christoffersson et al.

(10) Patent No.: US 12,302,408 B2
(45) Date of Patent: May 13, 2025

(54) UE, NETWORK NODE AND METHODS FOR HANDLING 2-STEP AND 4-STEP RANDOM ACCESS PROCEDURES

(71) Applicant: Telefonaktiebolaget LM Ericsson (publ), Stockholm (SE)

(72) Inventors: Jan Christoffersson, Luleå (SE); Min Wang, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 447 days.

(21) Appl. No.: 17/430,099

(22) PCT Filed: Dec. 3, 2019

(86) PCT No.: PCT/SE2019/051226
§ 371 (c)(1),
(2) Date: Aug. 11, 2021

(87) PCT Pub. No.: WO2020/167183
PCT Pub. Date: Aug. 20, 2020

(65) Prior Publication Data
US 2022/0150980 A1     May 12, 2022

Related U.S. Application Data

(60) Provisional application No. 62/804,244, filed on Feb. 12, 2019.

(51) Int. Cl.
*H04W 74/08*     (2024.01)
*H04W 72/23*     (2023.01)
(Continued)

(52) U.S. Cl.
CPC ....... *H04W 74/0841* (2013.01); *H04W 72/23* (2023.01); *H04W 74/0866* (2013.01); *H04W 80/02* (2013.01)

(58) Field of Classification Search
CPC ............ H04W 74/0841; H04W 72/23; H04W 74/0866; H04W 80/02; H04W 74/0833;
(Continued)

(56) References Cited

U.S. PATENT DOCUMENTS 11,564,246 B2 *  1/2023  Zhao ................... H04W 72/23
2018/0103465 A1  4/2018  Agiwal et al.
(Continued)

OTHER PUBLICATIONS

Sony, Considerations on initial access procedures for NR unlicensed, Nov. 16, 2018, R2-181817075 (Year: 2018).*
(Continued)

*Primary Examiner* — Jung Liu
(74) *Attorney, Agent, or Firm* — Rothwell, Figg, Ernst & Manbeck, P.C.

(57) ABSTRACT

The present disclosure relates to a method performed by a UE (101) for handling 2-step and 4-step RA procedures in a communications system (100). The UE (101) transmits a msgA comprising a preamble and a msg3 to a network node (103). The UE (101) applies a 2-step RA procedure when transmitting msgA. Based on a criterion, the UE (101) determines to fallback from the 2-step RA procedure to a 4-step RA, procedure. The criterion is that a maximum number of msgA transmissions has been exceeded or receipt of an indicator indicating that the UE (101) should fallback from the 2-step RA procedure to the 4-step RA procedure.

20 Claims, 15 Drawing Sheets

(51) Int. Cl.
*H04W 74/0833* (2024.01)
*H04W 80/02* (2009.01)

(58) Field of Classification Search
CPC ............. H04W 74/0836; H04W 72/21; H04W 74/004; H04W 74/006; H04W 74/002; H04W 24/02; H04W 74/06; H04L 27/2692
See application file for complete search history.

(56) References Cited

U.S. PATENT DOCUMENTS

| | | | | |
|---|---|---|---|---|
| 2018/0110074 | A1* | 4/2018 | Akkarakaran | H04W 72/21 |
| 2018/0279375 | A1* | 9/2018 | Jeon | H04W 74/0833 |
| 2018/0279376 | A1 | 9/2018 | Dinan et al. | |
| 2018/0368179 | A1 | 12/2018 | He et al. | |
| 2019/0281636 | A1* | 9/2019 | Liu | H04W 76/27 |
| 2022/0124828 | A1* | 4/2022 | Uchino | H04W 74/0833 |

OTHER PUBLICATIONS

Sony, "Considerations on initial acces sprocedures for NR unlicensed", R2-181817075 Nov. 16, 2018 (Year: 2018).*

International Search Report and the Written Opinion of the International Searching Authority, issued in corresponding International Application No. PCT/SE2019/051226, dated Feb. 21, 2020, 12 pages.

Sony "Considerations on initial access procedures for NR unlicensed" 3GPP TSG-RAN WG2 Meeting #103, R2-181817075 (revision of R2-1814736), Spokane, USA, Nov. 12-16, 2018, 4 pages.

Sony "2-step RACH to 4-step RACH fallback" 3GPP TSG RAN WG2 NR Adhoc, R2-1700137, Spoken, USA, Jan. 17-19, 2017, 4 pages.

Vivo "RAN2 impacts of 2-step RACH" 3GPP TSG-RAN WG2 Meeting #104, R2-1818260 (Revision of R2-1814263), Spokane, USA, Nov. 12-16, 2018, 5 pages.

LG Electronics Inc. "2-Step RACH procedure for NR-U" 3GPP TSG-RAN WG2 #103bis, R2-1818098 (Revision of R2-1815157), Spokane, USA, Nov. 12-16, 2018, 4 pages.

3GPP 3rd Generation Partnership Project; Technical Specification Group Radio Access Network; Evolved Universal Terrestrial Radio Access (E-UTRA); Medium Access Control (MAC) protocol specification (Release 15), 3GPP TS 36.321 V15.4.0 (Dec. 2018), 131 pages.

3GPP 3rd Generation Partnership Project; Technical Specification Group Radio Access Network; NR; Medium Access Control (MAC) protocol specification (Release 15), 3GPP TS 38.321 V15.4.0 (Dec. 2018), 77 pages.

* cited by examiner

UE, NETWORK NODE AND METHODS FOR HANDLING 2-STEP AND 4-STEP RANDOM ACCESS PROCEDURES

CROSS REFERENCE TO RELATED APPLICATION(S)

This application is a 35 U.S.C. § 371 National Phase of PCT/SE2019/051226, filed Dec. 3, 2019, designating the United States, which claims the benefit of U.S. Provisional Application No. 62/804,244, filed Feb. 12, 2019, the disclosures of which are incorporated herein by this reference.

TECHNICAL FIELD

The present disclosure relate generally to a User Equipment (UE), a method performed by the UE, a network node and a method performed by the network node. More particularly, it relates to handling 2-step and 4-step Random Access (RA) procedures, for example handling of fallback from a 2-step RA procedure to a 4-step RA procedure.

BACKGROUND

Next generation systems are expected to support a wide range of use cases with varying requirements ranging from fully mobile devices to stationary Internet of Things (IoT) devices or fixed wireless broadband devices. In New Radio (NR), both licensed assisted access and standalone unlicensed operation are to be supported in the Third Generation Partnership Project (3GPP). Hence the procedure of Physical Random Access Channel (PRACH) transmission and/or Scheduling Request (SR) transmission in an unlicensed spectrum shall be investigated in 3GPP. In the following, a channel sensing scheme based on Listen Before Talk (LBT), a Random Access (RA) procedure and a LBT scheme for PRACH is introduced as a basis to address the solutions.

PRACH is a channel used to carry RA preambles used for initiation of random access procedure, i.e. it is used by UEs to request an uplink allocation from the network node, e.g. a base station. PRACH is an uplink physical layer channel, and its corresponding transport layer channel is the Random Access Channel (RACH). RACH, also referred to as a broadcast channel, is a channel which is shared amongst the UEs to access the mobile network and for call setup and data transmission. In other word, RACH is an uplink transport layer channel used for synchronizing the UE with the network node, e.g. a base station, and for obtain a resource for Message 3 (msg3), e.g. a Radio Resource Control (RRC) Connection Request.

LBT, also referred to as Listen Before Transmit, is a protocol that makes it possible for multiple UEs to share the same channel. When LBT is enabled, the UE continuously monitors channels so as to transmit only when a channel is not in use, i.e. the UE listens for any potential infringing signals on the channel before it begins its transmission. If the channel is free, then the UE starts to transmit.

Radio Resource Management (RRM) Measurements in NR Unlicensed Spectrum

In order to tackle with the ever increasing data demanding, NR is considered in both the licensed and unlicensed spectrum. The standardization work for the licensed spectrum in Release 15 is still on-going. Therefore, the 3GPP has defined a study item on NR-based Access to Unlicensed Spectrum which was approved at RAN-77. At this study item, compared to the Long Term Evolution (LTE) Licensed Assisted Access (LAA), the NR-Unlicensed spectrum (NR-U) also need to support Dual Connectivity (DC) and standalone scenarios, where the Medium Access Control (MAC) procedures including RACH and scheduling procedure on unlicensed spectrum are subject to the LBT failures. There was no such restriction in LTE LAA, since there was licensed spectrum in LAA scenario so the RACH and scheduling related signaling can be transmitted on the licensed spectrum instead of unlicensed spectrum.

The RRM procedures in NR-U would be generally rather similar as in LAA, since NR-U is aiming to reuse LAA/eLAA/feLAA technologies as much as possible to handle the coexistence between NR-U and other legacy Radio Access Technologies (RAT). eLAA is short for enhancing LAA and feLAA is short for Further enhancements to LAA. Channel access/selection for LAA was one of the important aspects for co-existence with other RAT such as Wi-Fi. For instance, LAA has aimed to use carriers that are congested with Wi-Fi. Therefore, RRM measurements as one critical aspect has been designed are critical for the congestion avoidance purpose.

In licensed spectrum, the UE measures the Reference Signal Received Power (RSRP) and the Reference Signal Received Quality (RSRQ) of the downlink radio channel, and provides the measurement reports to its serving evolved Node B (eNB)/gNB. However, they don't reflect the interference strength on the carrier. Another metric called the Received Signal Strength Indicator (RSSI) can serve for such purpose. At the eNB/gNB side, it is possible to derive the RSSI based on the received RSRP and RSRQ reports. However, this requires that they must be available. Due to the LBT failure, some reports in terms of RSRP or RSRP may be blocked. They can be blocked either due to that the reference signal transmission, e.g. Discovery Reference Signal (DRS) is blocked in the downlink or the measurement report is blocked in the uplink. Hence, the measurements in terms of RSSI are very useful. The RSSI measurements together with the time information concerning when and how long time that UEs have made the measurements can assist the gNB/eNB to detect the hidden node. Additionally, the gNB/eNB can measure the load situation of the carrier which is useful for the network to prioritize some channels for load balance and channel access failure avoidance purposes.

LBT is designed for unlicensed spectrum co-existence with other RATs. In this mechanism, a radio device, e.g., UE, applies a Clear Channel Assessment (CCA) check before any transmission. The transmitter involves Energy Detection (ED) over a time period compared to a certain threshold, ED threshold, in order to determine if a channel is idle. In case the channel is determined to be occupied, the transmitter in the UE or the eNB performs a random back-off action within a contention window before the next Clear Channel Assessment (CCA) attempt. In order to protect the Acknowledgement (ACK) transmissions, the transmitter must defer a period after each busy CCA slot prior to resuming back-off. As soon as the transmitter has grasped access to a channel, the transmitter is only allowed to perform transmission up to maximum time duration, namely, the Maximum Channel Occupancy Time (MCOT). For Quality of Service (QoS) differentiation, a channel access priority based on the service type has been defined. For example, there are four LBT priority classes defined for differentiation of Contention Window Sizes (CWS) and MCOT between services.

Some LBT categories are defined as below:
Category 1: No LBT
Category 2: LBT without random back-off Category 3: LBT with random back-off with fixed size of contention window Category 4: LBT with random back-off with variable size of contention window A back-off action may be described as the device waits for a time delay before attempting a next CCA action.

Channel Access Procedure for MuLteFire (MF)

In Section 14 in 3GPP TS 36.321-f00, the LBT procedures for PRACH and shortened Physical Uplink Control Channel (sPUCCH) are defined as follows:

The UE shall use Type 1 channel access procedure to transmit a transmission including the SR at subframe n which is configured by higher layer signaling, if a UE does not detect Physical Downlink Control Channel (PDCCH) with Downlink Control Information (DCI) Cyclic Redundancy Check (CRC) scrambled by Cell Controlling-Radio Network Temporary Identifier (CC-RNTI) in subframe n−1, where n is a positive integer. Uplink (UL) channel access priority class p=1 may be used for SR transmissions.

For MF, a UE shall transmit a transmission including MuLteFire-evolved Physical Uplink Control Channel (MF-ePUCCH) on a channel on which MF transmission(s) are performed following the same channel access procedure defined for Physical Uplink Shared Channel (PUSCH) transmission.

For MF cells, the UE may transmit a transmission including MuLteFire-shortened Physical Uplink Control Channel (MF-sPUCCH) on a channel. A UE may perform type 2 channel access procedure if MF-sPUCCH-LBT is enabled by higher layer signaling. A UE may transmit without performing channel sensing if MF-sPUCCH-LBT is not enabled by higher layer signaling. A MF eNB ensures that the MF-sPUCCH transmission immediately follows the preceding Downlink (DL) transmission within 16 us if MF-sPUCCH-LBT is set to be false.

For MF cells, a UE may transmit a transmission including PRACH on a channel on which MF transmission(s) are performed using type 2 channel access procedure if MF-PRACH-LBT is set to be true by higher layer signaling. A UE may transmit a transmission including PRACH on a channel without performing channel sensing, if MF-PRACH-LBT is set to be false by higher layer signaling.

For MF cells, when MF-PRACH-LBT is set to true, and MF-sPUCCH-LBT is set to false, the UE should perform a type 2 channel access procedure on subframe n which is configured by higher layer signaling for PRACH transmission, where n is a positive integer.

RACH Procedures in NR Unlicensed Spectrum

The ordinary 4-step RA procedure has been the current standard for legacy systems such as LTE and NR Release 15. It has been proposed to study a 2-step RA procedure where the UL messages, i.e. PRACH+msg3, are sent simultaneously, similarly the two DL messages, e.g. time advance command in RACH Response (RAR) and contention resolution information, are sent as a simultaneous response in the DL. The msg3 in MsgA may be referred to as payload. In the legacy 4-step RA procedure, one of the main usages of the first two messages is to obtain UL time alignment for the UE. In many situations, e.g. in small cells or for stationary UEs, this may not be needed since either a Time Alignment (TA)=0 will be sufficient, e.g. small cells, or a stored TA value from the last RA could serve also for the current RA, e.g. stationary UE. In future radio networks, it can be expected that these situations are common, both due to dense deployments of small cells and a great number of e.g. stationary IoT devices. A possibility to skip the message exchange to obtain the TA value would lead to reduced RA latency and would be beneficial in several use cases, for example when transmitting infrequent small data packets. On the other hand, the 2-step RA procedure will consume more resources since it uses contention based transmission of the data. This means that the resources that are configured for the data may often be unused.

If both the 4-step and 2-step RA procedures are configured in a cell and for the UE, it can be assumed that the UE will chose either a preamble from one specific set if it wants to do a 2-step RA procedure, and from another set if it wants to do a 4-step RA procedure or select different PRACH resources, e.g. time and frequency, for the 2-step and 4-step RACH procedures. This is necessary for the gNB to distinguish between if the UE is doing a 2-step RA procedure or a 4-step RA procedure. The terms 2-step RACH procedure and 2-step RA procedure are used interchangeably herein, and the terms 4-step RACH procedure and 4-step RA procedure are also used interchangeably herein.

Legacy 4-Step RA Procedure

The legacy 4-step RA procedure is the baseline for both LTE and NR. The principle of this 4-step RA procedure is shown in FIG. 1. The UE 101 randomly selects a preamble which is transmitted to the eNB 103.

The 4-step RA procedure comprises the following 4-steps or 4 messages:

Msg1: Msg1 comprises a preamble or resources. Msg1 is transmitted from the UE 101 to the network node, e.g. the eNB 103. The network node may derive the UE ID from the preamble comprised in msg1.

Msg2: Msg2 may be a RAR message. Msg2 is transmitted from the network node 103 to the UE 101. Msg2 may comprise at least one of: C-RNTI, timing advance values and uplink grant resources.

Msg3: Msg3 may be a RRC connection request message. Msg3 is transmitted from the UE 101 to the network node 103. Msg3 may comprise at least one of: UE ID, connection establishment cause.

Msg4: Msg4 may be a contention resolution message. Msg4 is transmitted from the network node 103 to the UE 101.

The above overviews of msg1-msg4 are only examples. There may be other examples of these messages depending on the situation.

When the eNB 103 detects the preamble, it estimates the TA the UE 101 should use in order to obtain UL synch at the eNB 103. The eNB 103 responds with the TA and a grant for nsg3. In msg3, the UE 101 transmits its identifier, and the eNB 103 responds by acknowledging the UE ID in msg4. The msg4 gives contention resolution, i.e. only one UEs identifier will be sent even if several UEs 101 have used the same preamble and msg3 simultaneously. In LTE, the 4-step RA procedure cannot be completed in less than 14 ms/TTI/SF. TTI is short for Transmission Time Interval and SF is short for subframe.

The method exemplified in FIG. 1 comprises at least one of the following steps, which steps may be performed in any suitable order than described below:

Step 110: The UE 101 sends a RA preamble to the eNB 103.

Step 113: The eNB 103 sends a RA Response to the UE 101. The RA response comprises a TA, T-RNTI and a grant for msg3, or the TA-T-RNTI and grant for msg3 may be sent together with the RA Response.

Step 115: The UE 101 sends msg3 and C-RNTI/ID to the eNB 103, or the UE 101 sends msg3 comprising the C-RNTI/ID to the eNB 103.

Step 118: The eNB 103 sends msg 4 and content resolution to the UE 101. The content resolution may be comprised in the msg4 or sent together with msg4.

2-Step RA Procedure

The 2-step RA procedure gives much shorter latency than the ordinary or legacy 4-step RA procedure. In the 2-step RA procedure, the preamble transmitted on PRACH and a message corresponding to msg3 transmitted on PUSCH in the 4-step RA procedure are transmitted in the same or in two subsequent sub frames. The first message in the 2-step RA procedure is denoted Message A (msgA) in NR-U. The 2-step RA procedure is depicted in FIG. 2. In the 4-step RA procedure, the eNB grant is linked to a particular preamble. The same kind of mapping will be needed in the 2-step RA procedure. For all different RA Preamble IDs (RAPID) that have been configured for the 2-step RA procedure there must be a mapping to a particular PUSCH resource. The PUSCH resource may be time multiplexed, frequency multiplexed or code multiplexed. The exact for of multiplexing has not been agreed in 3GPP as of now.

Upon successful reception of msgA, i.e. both the preamble and msg3, the eNB 103 will respond with a TA, which by assumption should not be needed or just give very minor updates, and a msg4 for contention resolution. The second message in the 2-step RA procedure is denoted Message B (msgB) in NR-U.

The method exemplified in FIG. 2 comprises at least one of the following steps, which steps may be performed in any suitable order than described below:

Step 201: The UE 101 sends a RA preamble to the eNB 103.

Step 203: The UE 101 sends msg3 and C-RNTI/ID to the eNB 103. The C-RNTI/ID may be seen as being comprised in msg3.

Step 205: The eNB 103 sends a RA Response and TA to the UE 101. The TA may be comprised in the RA Response or sent together with the RA response.

Step 208: The eNB 103 sends msg4 and content resolution to the UE 101. The content resolution may be comprised in msg4 or it may be sent together with msg4.

The RA preamble, msg3 and c_RNTI/IS may be sent in the same SF from the UE 101 to the eNB 103. The RA response, TA, msg4 and content resolution may be sent in the same SF from the eNB 103 to the UE 101.

In case the UE 101 does not receive a msgB in the 2-step RA procedure, it would re-try with a new msgA, similar to the action taken by the UE 101 which does not receive a RAR in the 4-step RA procedure.

Note that FIG. 1 and FIG. 2 shows an eNB 103, but it may be equally applicable to a gNB 103 or any other suitable network node. The reference number 103 will be used herein when referring to any of the eNB, gNB and network node.

An issue that may occur is that the eNB 103 only detects the preamble from a UE 101. This may happen if the UE TA is bad, e.g. using TA=0 in a large cell or using an old TA. It may also happen that a transmission with an inaccurate TA value of another UE 101 is interfering. Additionally, the preamble signal has higher detection probability than the normal data due to its design pattern even though the UE 101 has moved. A third reason may be because the transmission is colliding with another UE 101 using the same preamble but transmits a different msg3 part, i.e. the preamble is detected but only one of the Msg3 parts is detected. In this case the eNB 103 may reply with an ordinary RAR message giving the UE 101 an opportunity to transmit an ordinary msg3 on a scheduled resource. This is called a fallback to 4-step RA procedure. It should be noted that the exact UE behavior has not been specified for this case.

As described above, if the UE 101 receives a grant, e.g. in a RAR message, for transmission of the msg3 part after transmitting a msgA in the 2-step RA procedure, there is an option of either retransmitting the entire msgA on the next PRACH occasion (RO) or to use the grant to transmit the Msg3 part assuming the subsequent RA messages follows a 4-step RA procedure. This choice may have an impact on random access performance. The criteria are still under discussions in 3GPP. Therefore, it is a need for solutions to address them accordingly.

Therefore, there is a need to at least mitigate or solve this issue.

SUMMARY

An objective of the present disclosure is therefore to obviate at least one of the above disadvantages and to improve RA performance in a communications system. It may also be an objective to enable fallback from a 2-step RA procedure to a 4-step RA procedure, or to improve fallback from a 2-step RA procedure to a 4-step RA procedure.

According to a first aspect, the object is achieved by a method performed by a UE for handling 2-step and 4-step RA procedures in a communications system: the UE transmits a msgA comprising a preamble and a msg, to a network node. The UE applies a 2-step RA procedure when transmitting msgA. Based on a criterion, the UE determines to fallback from the 2-step RA procedure to a 4-step RA procedure. The criterion is that a maximum number of msgA transmissions has been exceeded or receipt of an indicator indicating that the UE should fallback from the 2-step RA procedure to the 4-step RA procedure.

According to a second aspect, the object is achieved by a method performed by a network node for handling 2-step and 4-step RA procedures in a communications system. The network node receives msgA comprising a preamble and a msg3 from a UE applying a 2-step RA procedure.

According to a third aspect, the object is achieved by a UE for handling 2-step and 4-step RA procedures in a communications system. The UE is adapted to transmit a msgA comprising a preamble and a msg, to a network node. The UE applies a 2-step RA procedure when transmitting msgA. The UE is adapted to, based on a criterion, determine to fallback from the 2-step RA procedure to a 4-step RA, procedure. The criterion is that a maximum number of msgA transmissions has been exceeded or receipt of an indicator indicating that the UE should fallback from the 2-step RA procedure to the 4-step RA procedure.

According to a fourth aspect, the object is achieved by a network node for handling 2-step and 4-step RA procedures. The network node is adapted to receive a msgA comprising a preamble and a msg3 from a UE applying a 2-step RA procedure.

The present disclosure affords many advantages, of which a non-exhaustive list follows:

One advantage is that the performance of RA is optimized with optimized latency management.

Another advantage is that the negative impact due to LBT failure on UL data transfer is reduced.

A further advantage is that UL RACH performance is eliminated.

The present disclosure is not limited to the features and advantages mentioned above. A person skilled in the art will recognize additional features and advantages upon reading the following detailed description.

BRIEF DESCRIPTION OF THE DRAWINGS

The present disclosure will now be further described in more detail by way of example only in the following detailed description by reference to the appended drawings and in which.

DETAILED DESCRIPTION

The present disclosure relate to determining if the UE should utilize the msg3 grant or to retransmit the entire msgA. This choice may be based on minimizing latency and optimizing system utilization. In NR-U systems, it may also maximize the probability of successful transmission.

Figure 1:
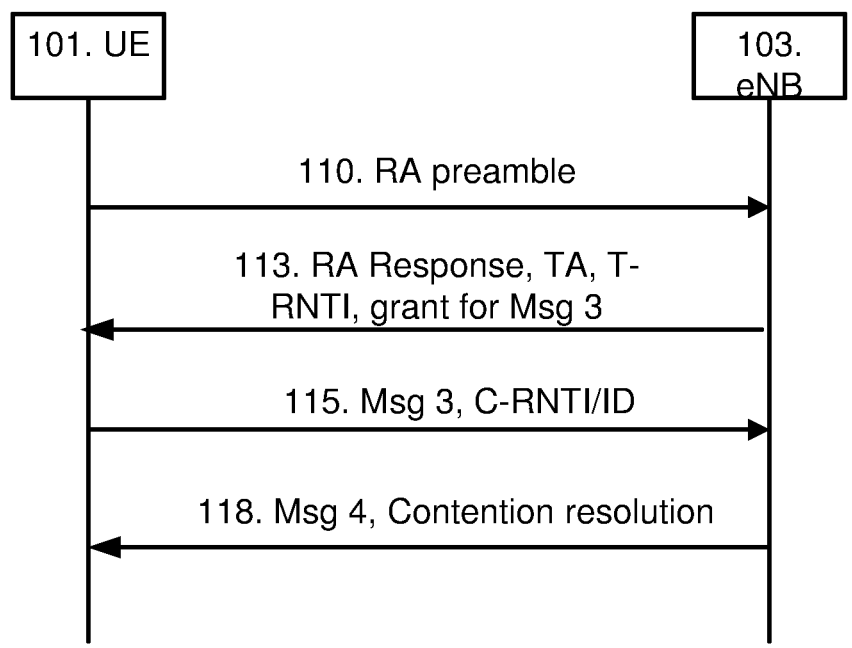
FIG. 1 is a schematic block diagram illustrating a 4-Step RA procedure.
Figure 2:
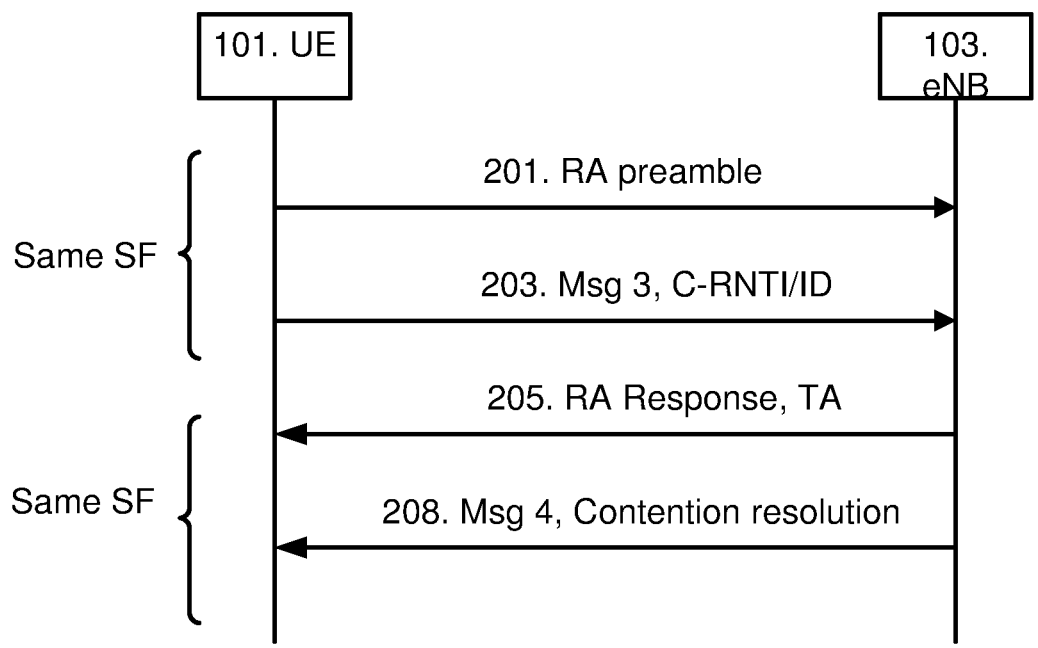
FIG. 2 is a schematic block diagram illustrating a 2-Step RA procedure.
Figure 3:
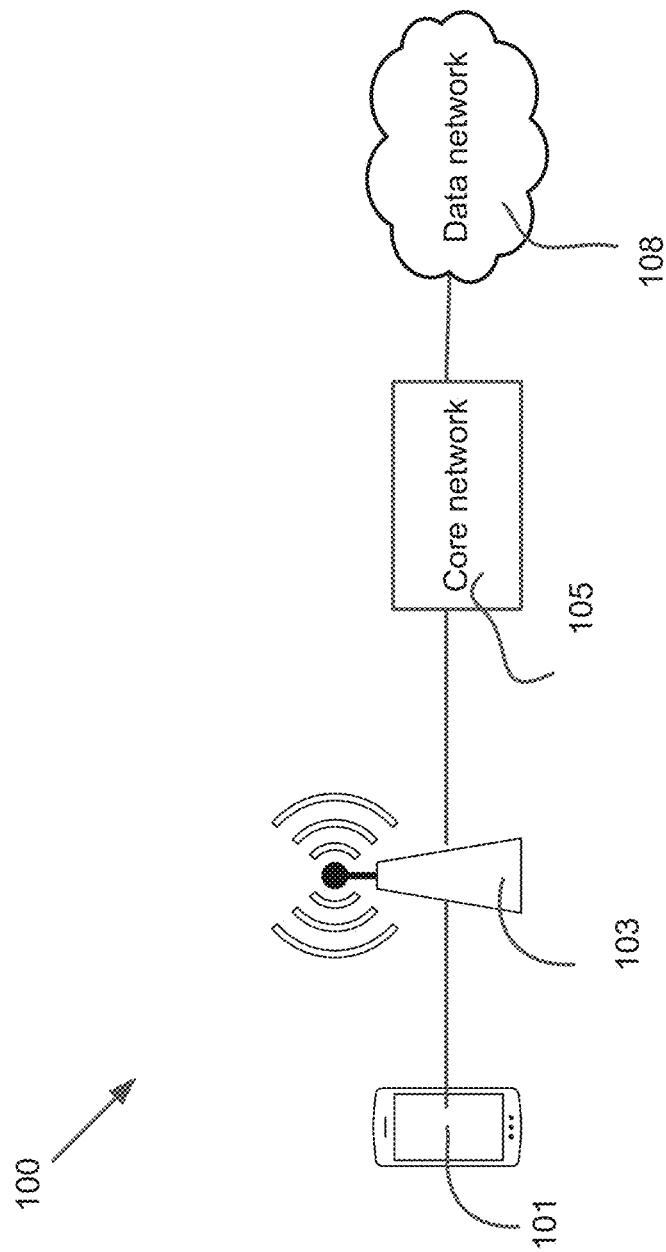
FIG. 3 is a schematic block diagram illustrating a communications system.

FIG. 3 depicts a communications system 100, which may be a wireless communications network, sometimes also referred to as a wireless communications system, cellular radio system, or cellular network. The communications system 100 may typically be a 5G system, 5G network, NR-U or Next Gen System or network, LAA, MulteFire, a 4G system, a 3G system, a 2G system, a further generation system or any other suitable system. The communications system 100 may alternatively be a younger system than a 5G system The communications system 100 may support other technologies such as, for example, Long-Term Evolution (LTE), LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, NB-IoT. Thus, although terminology from 5G/NR and LTE may be used in this disclosure, this should not be seen as limiting to only the aforementioned systems. The present disclosure applies to any previous, current or future system.

The communications system 100 comprises a plurality of network nodes, whereof a network node 103 is depicted in FIG. 3. The network node 103 may be a radio network node, such as a radio base station, or any other network node with similar features capable of serving a UE, such as a wireless device or a machine type communication device, in the communications system 100. The network node 103 may be an eNB. The network node 103 may be a first gNB. The network node 103 may be a MeNB.

The communications system 100 covers a geographical area which may be divided into cell areas, wherein each cell area may be served by a network node, although, one network node may serve one or several cells. The network node 103 may be of a certain class such as, e.g., macro base station (BS), home BS or pico BS based on transmission power and thereby also cell size. The network node 103 may be directly connected to one or more core networks 105. The network node 103 may be a distributed node, such as a virtual node in the cloud, and it may perform its functions entirely on the cloud, or partially, in collaboration with a radio network node. The core network 105 is connected to a data network 108 which provides services to the UE 101.

A plurality UEs may be located in the communication system 100, whereof a UE 101, which may also be referred to simply as a device, is depicted in FIG. 3. The UE 101, e.g. a LTE UE or a 5G/NR UE, may be a wireless communication device which may also be known as e.g., a wireless device, a mobile terminal, wireless terminal and/or mobile station, a mobile telephone, cellular telephone, or laptop with wireless capability, just to mention some further examples. The UE 101 may be a device by which a subscriber may access services offered by an operator's network and services outside operator's network to which the operator's radio access network and core network provide access, e.g. access to the Internet. The UE 101 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device, Internet of Things (IOT) device, terminal device, communication device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE, a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system.

The network node 103 may be configured to communicate in the communications system 100 with the UE 101 over a communication link, e.g., a radio link or a wired link, although communication over more links may be possible.

The UE 101 is enabled to communicate wirelessly within the communications system 1. The communication may be performed e.g. between two devices, between a devices and a regular telephone, between the UE 101 and a network node, between network nodes, and/or between the devices and a server via the radio access network and possibly one or more core networks and possibly the internet.

It should be noted that the communication links in the communications network may be of any suitable kind including either a wired or wireless link. The link may use any suitable protocol depending on type and level of layer, e.g. as indicated by the Open Systems Interconnection (OSI) model, as understood by the person skilled in the art.

Figure 4:
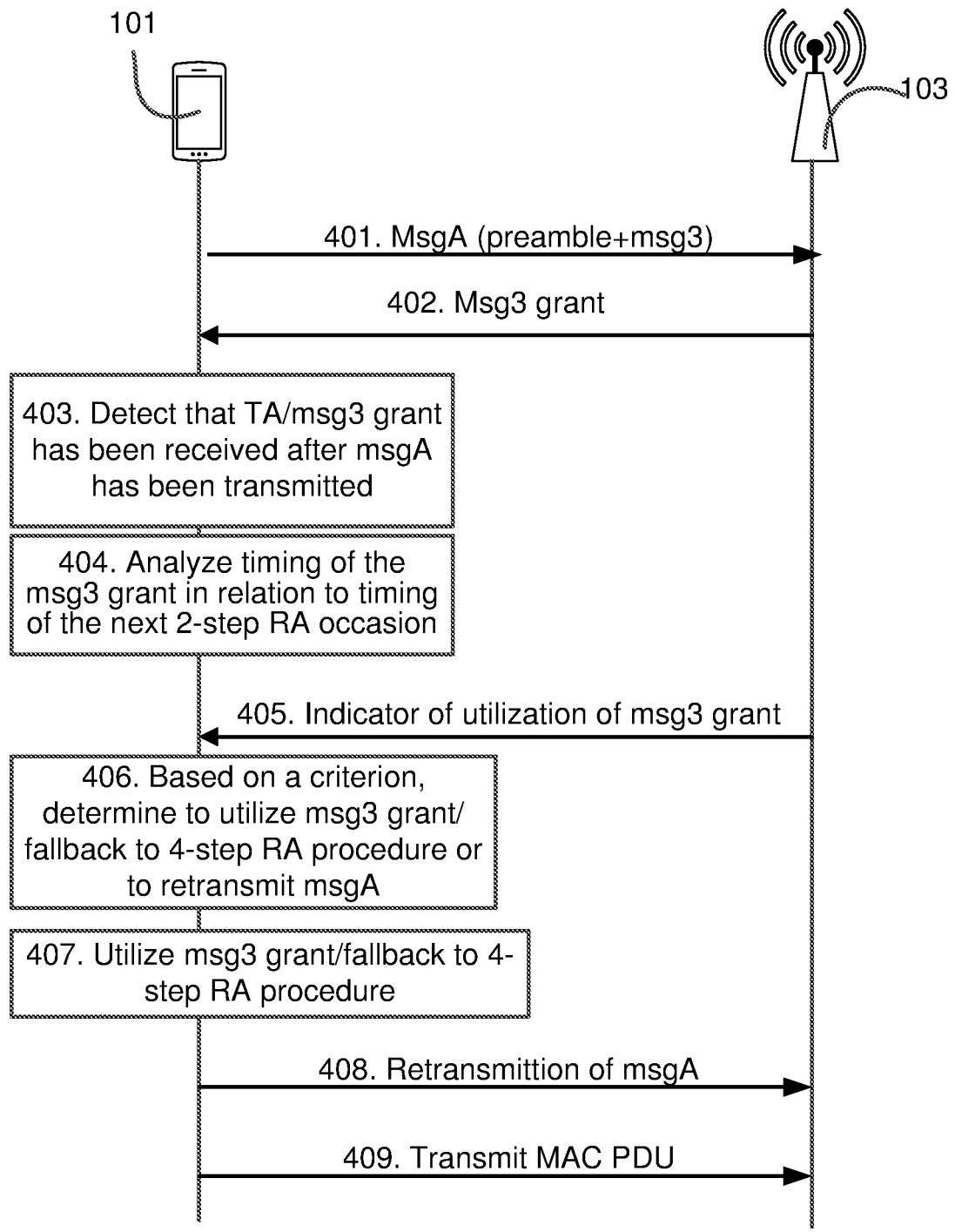
FIG. 4 is a signaling diagram illustrating a method.

FIG. 4 is a signalling diagram illustrating a method. The UE 101 may be adapted to access a licensed and/or unlicensed spectrum in a communications system 100, e.g. a NR communications system. The communications system 100 may be a 2G system, a 3G system, a 4G system, a 5G system or any other legacy or future system. The network node 103 may be an eNB or a gNB or any other suitable network node.

The method in FIG. 4 comprises at least one of the following steps, which step may be performed in any suitable order than described below:

Step 401

The UE 101 transmits a msgA comprising a preamble and a msg3 to a network node 103. The network node 103 receives the msgA comprising the preamble and msg3 from the UE 101. The UE 101 may apply a 2-step RA procedure when transmitting msgA.

Step 402

The network node 103 transmits a msg3 grant to the UE 101. The UE 101 receives the msg3 grant from the network node 103.

Step 403

The UE 101 detects that the msg3 grant has been received by the UE 101 after the msgA has been transmitted to the network node 103.

Step 404

The UE 101 may analyze timing of the msg3 grant in relation to timing of the next 2-step RA occasion. A RA occasion may be an area or position specified in time and frequency domain that are available for the reception of RACH preamble.

Step 405

The network node 103 may transmit, to the UE 101, an indicator indicating that the UE 101 should utilize the msg3 grant to retransmit msgA. The UE 101 may receive, from the network node 103, the indicator indicating that the UE 101 should utilize the msg3 grant to retransmit msgA.

In step 405, the network node 103 may transmit an indicator indicating to the UE 101 that it should fallback from the 2-step RA procedure to the 4-step RA procedure. The indicator may be a fallback indicator.

The indicator may be a one-bit field where the value 1 may indicate utilization of msg3 grant/fallback from the 2-step RA procedure to the 4-step RA procedure and where the value 0 may indicate retransmission of msgA.

The indicator may be a one-bit field where the value 0 may indicate utilization of the msg3 grant/fallback from the 2-step RA procedure to the 4-step RA procedure and where the value 1 may indicate retransmission of msgA.

The indicator may be a reused R bit in the RAR MAC subheader or the payload section. The RAR MAC subheader is the RAR, i.e. msgB in context of the 2-step RA procedure. The payload section may be msg3 in msgA. The term msg3 and payload or may be used interchangeably herein. The term payload may be used for the sake of simplicity when referring to a payload section of msgA.

The indicator may be one or two BIs comprised in a MAC subheader of a RAR MAC PDU received by the UE 101, e.g. from the network node 103.

The indicator may be transmitted in a RAR grant message.

Step 406

Based on a criterion, the UE 101 determines to utilize the msg3 grant to retransmit msgA or to fallback from the 2-step RA procedure to the 4-step RA procedure. The criterion for the decision to utilize the msg3 grant to retransmit msgA or to fallback from the 2-step RA procedure to the 4-step RA procedure may be based on a result of the analysis in step 404. Fallback form the 2-step RA procedure to the 4-step RA procedure may be described as the UE 101 changing from applying the 2-step RA procedure to applying the 4-step RA procedure.

In step 406, the UE 101, based on a criterion, determines to fallback from the 2-step RA procedure to the 4-step RA procedure. The criterion is that a maximum number of msgA transmissions has been exceeded, or the criterion is that the UE 101 receives an indicator indicating that the UE 101 should fallback from the 2-step RA procedure to the 4-step RA procedure. The indicator may be referred to as a fallback indicator. Thus, when maximum number of msgA transmission has been exceeded or that the UE 101 has received an indicator indicating that the UE 101 should fallback from the 2-step RA procedure to the 4-step RA procedure, then the UE 101 determines to fallback from the 2-step RA procedure to the 4-step RA procedure. Thus, there are two scenarios when the UE 101 determines to fallback from the 2-step RA procedure to the 4-step RA procedure.

The UE 101 may determine to utilize the msg3 grant to retransmit msgA when the criterion is not fulfilled, i.e. when the maximum number of msgA transmission has not been exceeded or when the indicator has not been received.

The criterion for the decision to utilize the msg3 grant to retransmit msgA or to fallback from the 2-step RA procedure to the 4-step RA procedure may be further based on a priority of random access.

The criterion may be associated with a maximum number of msgA preamble transmissions which the UE 101 is allowed to perform. The UE 101 may determine to fallback from the 2-step RA procedure to the 4-step RA procedure when the maximum number of preamble transmissions has been exceeded. When the UE 101 receives nothing, it tries a 4-step RA procedure using only the preamble instead.

The criterion may be associated with a timer. The UE 101 may determine to fallback from the 2-step RA procedure to the 4-step RA procedure when the UE 101 has not received any RAR comprising a RAPID that matches a preamble index comprised in the transmitted msgA when the timer is expired.

The criterion may be associated with the indicator received in step 405. The UE 101 may determine to utilize the msg3 grant or to fallback from the 2-step RA procedure to the 4-step RA procedure when it has received the indicator from the network node 103.

The criterion may be associated with a UL grant and/or an indicator comprised in msg3/RAR. The presence of the UL grant in the msg3 may indicate that the UE 101 shall utilize the msg3 grant to retransmit msgA. The presence of the UL grant and an indicator may indicate that the UE 101 shall utilize the msg3 grant to retransmit msgA. No UL grant but the presence of an indicator may indicate that the UE 101 shall retransmit msgA. Retransmission of msgA may be performed in one or both of the following cases:

When the maximum number of MsgA transmissions is not reached
When no fallback indicator is received.

The criterion may be configured by or received from the network node 103, or the criterion may be obtained or determined by the UE 101.

Step 407

The UE 101 may utilize the msg3 grant or fallback from the 2-step RA procedure to the 4-step RA procedure. The grant is utilized if something is transmitted on the granted resource.

Step 407 may be described as the UE falls back from the 2-step RA procedure to the 4-step RA procedure.

Step 408

The UE 101 may retransmit the msgA to the network node 103. The network node 103 may receive the retransmitted msgA from the UE 101. The UE 101 may apply a 2-step RA procedure when retransmitting msgA.

Step 408 may be performed when the criterion has not been met or fulfilled, i.e. when the maximum number of msgA transmissions has not been exceeded, or when the UE 101 has not received an indicator indicating that the UE 101 should fallback from the 2-step RA procedure to the 4-step RA procedure.

Both the msg3 grant may be utilized and the msgA may be retransmitted when no new msgB is received from the network node 103 between the transmissions. Receiving a msgB may mean that a msgA has been received successfully. Then, there is no need to send a msg3 since this was already contained in msgA.

The UE 101 may retransmit, to the network node 103, msgA comprising an indicator of that msgA is linked to the msg3 grant, i.e. that msgA and the msg3 grant belongs to the same UE 101. The network node 103 may receive the retransmitted msgA comprising an indicator of that msgA is linked to the msg3 grant from the UE 101.

The msg3 grant may be used to transmit data instead of a msg3, since the msg3 is part of msgA.

Step 409

The UE 101 may transmit a MAC PDU comprising MAC CEs and/or data using the msg3 grant to the network node 103. The network node 103 may receive a MAC PDU comprising MAC CEs and/or data using the msg3 grant from the UE 101

UE actions after transmission of a msgA will now be described. The description herein is applicable to the 2-step RA procedure in both licensed and unlicensed scenarios.

Upon receiving a grant for msg3 in a RAR after transmitting a msgA in the 2-step RA procedure, i.e. when a fallback to the 4-step RA procedure is triggered by the gNB 103. The UE 101 may check the timing of the grant indicated in the RAR and the next 2-step RA occasion. The timing may be a relative timing.

Figure 5:
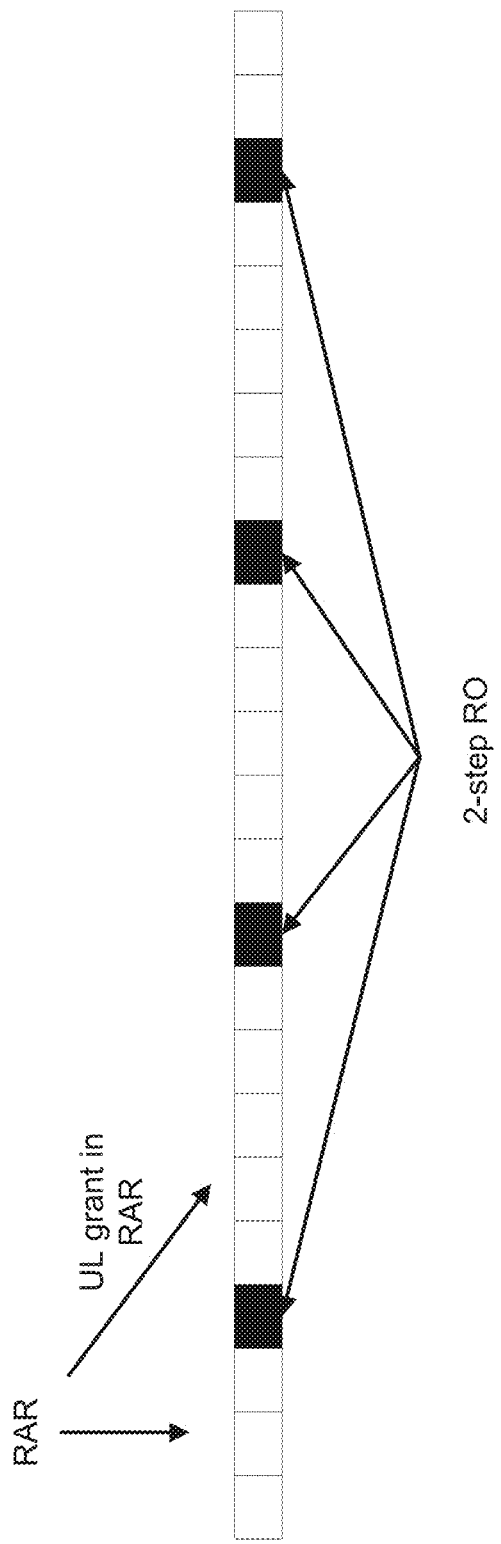
FIG. 5 is a schematic drawing illustrating timing of RAR grant and 2-step RO.

An example of timing of RAR grant and 2-step ROs is shown in FIG. 5. In this example, the grant in the RAR is for a slot/subframe which is after the next available 2-step RO. In the case of the 2-step RA, we mean by RO the time when msgA is transmitted, i.e. both the preamble and the msg3 part. Depending on the configuration, e.g. time or frequency multiplexing of different msg3 parts, these may be separated in time and in this case we mean the time where both have been transmitted. Which happens first, i.e. RAR grant or next 2-step RO, depends on the PRACH configuration for the 2-step RA procedure and when the RAR grant is.

If the next 2-step RO is before the RAR grant, the UE 101 may transmit a new msgA in the next RO and ignores the RAR grant, i.e. the UE 101 does not do the fallback from the 2-step RA procedure to the 4-step RA procedure.

Further, the decision may be dependent on priority such that if the next RO is before the RAR grant, the UE 101 transmits a new msgA in the next RO and ignores the RAR grant depending on the priority of the random access. If the random access is low priority it uses the RAR grant.

E.g. for NR-U, the UE 101 may use both the next 2-step RO and the RAR grant and transmit both a msgA and a msg3 if no new RAR or msgB is received between the transmission. This increases the chances of doing a successful transmission even if one transmission fails LBT. The same dependence on priorities may apply here.

The UE 101 may use the 2-step RO to transmit a msgA and the RAR grant to transmit a MAC PDU containing MAC CEs, e.g. Buffer Status Report (BSR), Power Headroom Report (PHR) etc., and/or data. The msgA may comprise an indicator that the msgA is linked to the RAR grant, i.e. belongs to the same UE 101. This may allow the UE to use the first 2-step RO and still not waste the RAR grant.

The network node 103 may configure a separate maximum number of preamble transmission attempts for the 2-step RA procedure, based on which a UE 101 can perform fallback from the 2-step RA procedure to a 4-step RA procedure in case the UE 101 doesn't receive a RAR containing RAPID in its associated MAC subheader that matches the transmitted PREAMBLE_INDEX, since there may be a congestion of 2-step RA resources. However, there may be still free resources available for the 4-step RA procedure. The network node 103 may configure a timer, if the UE 101 doesn't receive a RAR containing RAPID in its associated MAC subheader that matches the transmitted PREAMBLE_INDEX when the timer is expired, a fallback from the 2-step RA procedure to a 4-step RA procedure can be triggered by the UE 101. The UE 101 may then randomly select a preamble or PRACH resources from the resource pools reserved for the 4-step RA procedure, and initiate a RA accordingly.

The network node 103 may provide indicators on the fallback option in the MAC subheader in a RAR message. A UE 101 has received a RAR message however, the RAPID that has been transmitted is not carried by the MAC subheader, and an indicator indicating the UE 101 should fallback from the 2-step RA procedure to the 4-step RA procedure is also carried. The indicator may be carried/indicated by the RAR message or the MAC subheader explicitly or implicitly.

The UE 101 may receive a MAC PDU containing a MAC subheader with a BI only, meaning there is no MAC payload for RAR. There may be several options:

Option 1: The explicit indicator may be a one-bit field, the value "1" indicates a fallback from the 2-step RA procedure to the 4-step RA procedure, while the value "0" means the option of retransmission of msgA.

Option 2: The explicit indicator may be a one-bit field, the value "0" indicates a fallback from the 2-step RA procedure to the 4-step RA procedure, while the value "1" means the option of retransmission of msgA Option 3: The explicit indicator reuses one of R bits in the MAC subheader or the payload section.

Figure 6:
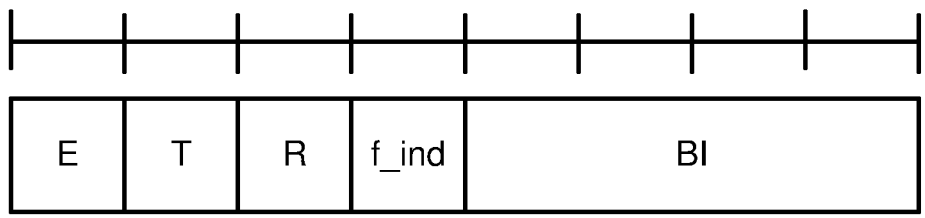
FIG. 6 is a schematic drawing illustrating the RAR MAC subheader comprising a fallback indicator.
Figure 7:
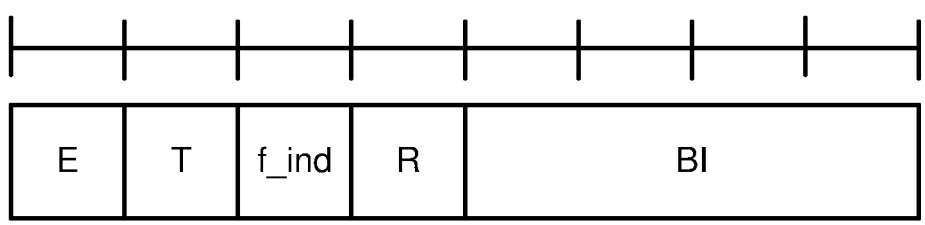
FIG. 7 is a schematic drawing illustrating the RAR MAC subheader comprising a fallback indicator.

FIG. 6 and FIG. 7 shows the fallback indicator f_ind. The fallback indicator f_ind may occupy one of the R bits. FIG. 6 shows the RAR MAC subheader comprising the fallback indicator. The RAR MAC subheader comprises the following parameters in the following order: E, T, R, f_ind and the BI.

The E parameter may be an extension field and may be a flag indicating if the MAC subPDU including this MAC subheader is the last MAC subPDU or not in the MAC PDU. The E field is set to "1" to indicate at least another MAC subPDU follows. The E field is set to "0" to indicate that the MAC subPDU including this MAC subheader is the last MAC subPDU in the MAC PDU. The T parameter may be a type field and may be a flag indicating whether the MAC subheader contains a RAPID or a BI. The T field is set to "0" to indicate the presence of a BI field in the subheader. The T field is set to "1" to indicate the presence of a RAPID field in the subheader. The R parameter may be a reserved bit, set to "0".

FIG. 7 shows the RAR MAC subheader comprising the fallback indicator. The RAR MAC subheader comprises the following parameters in the following order: E, T, f_ind, R, BI. Thus, the f_ind may be located at different positions in the RAR MAC subheader. As mentioned earlier, BI is short for Backoff Indicator. The parameters E, T and R are as described above.

Figure 8:
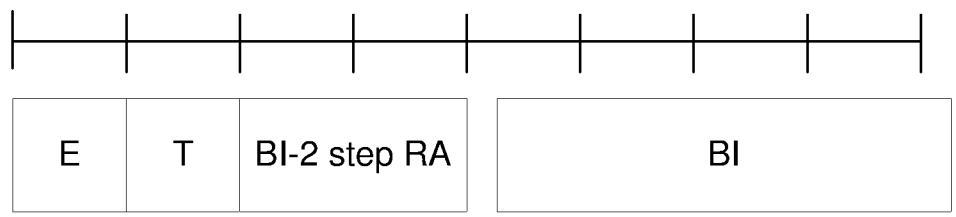
FIG. 8 is a schematic drawing illustrating the RAR MAC subheader comprising the Backoff Indicator (BI) indicator.
Figure 9:
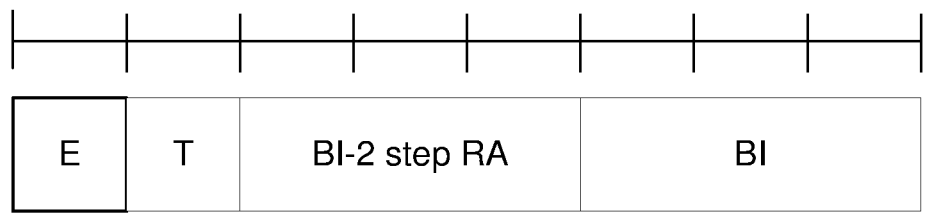
FIG. 9 is a schematic drawing illustrating the RAR MAC subheader comprising the BI indicator.

The UE 101 may receive a MAC PDU comprising a MAC subheader with BI only, meaning there is no MAC payload for RAR. The fallback from the 2-step RA procedure to the 4-step RA procedure may be indicated via a BI field. In other words, the presence of a BI field may mean that the UE 101 shall do fallback from the 2-step RA procedure to the 4-step RA procedure. The absence of a BI field may mean that the UE 101 shall do a retransmission of MsgA, meaning that the UE 101 doesn't receive any RAR or doesn't receive a RAR containing a RAPID in its associated MAC subheader that matches the transmitted PREAMBLE_INDEX. There may be at least two options to carry a BI field for UEs 101 with 2-step RA procedure:

Option 1: The RAR MAC subheader may carry two BI fields, one BI field is indicating congestion status for the 4-step RA procedure, while another BI field is indicating congestion status for the 2-step RA procedure. One RAR MAC subheader with the BI indicator is shown in FIG. 8. In FIG. 8, the BI for 2-step RA occupies 2 bits. Another RAR MAC subheader with the BI indicator is shown in FIG. 9, where the BI for the 2-step RA procedure contains 3 bits, where 1 bit taken from the BI field for 4-step RA. The Type field may be a flag indicating whether the MAC subheader contains a RAPID or BIs. The T field may be set to "0" to indicate the presence of two BI fields in the subheader. The T field may be set to "1" to indicate the presence of a RAPID field in the subheader.

Option 2: There may be no change on the existing RAR MAC subheader. The UE 101 may identify if the BI is used to indicate backoff for 2-step RA procedure depending on a configured reception order. The first received RAR MAC subheader may carry a BI may be for 4-step RA, while the secondly received RAR MAC subheader carrying a BI may be for the 2-step RA procedure, or vice versa, the first one may be for the 2-step RA procedure, while the second one may be for 4-step RA procedure. A 2-step RA MAC subheader and a 4-step RA MAC subheader may be placed/transmitted in a same MAC PDU.

The UE 101 may have received a RAR message. The RAPID that has been transmitted may be contained in the MAC subheader meaning that the transmitted 2-step RA preamble has been successfully detected by the network node 103 while the RAR message doesn't contain signaling content to respond payload part in msgA. In this case, the UE 101 may have at least one of the following options to continue:

Option 1: There may be a UL grant carried by the RAR message, meaning that the UE 101 shall perform fallback from the 2-step RA procedure to the 4-step RA procedure.

Option 2: There may be a UL grant plus one indicator indicating that the UE 101 shall perform fallback from the 2-step RA procedure to the 4-step RA procedure. The indicator may reuse one of R bits in the RAR or the MAC subheader.

Option 3; There may be no UL grant, however, there is one indicator indicating the UE 101 shall perform retransmission of msgA.

All of the above can be configured by the network node 103 per UE/priority of the RA. The priority can be based on at least one of:

If the UE 101 is doing a prioritized RA, e.g. according to 3GPP TS 38.321; and/or If the network node 103 has configured certain RA purpose with different priorities, and/or If the UE 101 has services or data with certain priorities, e.g. Ultra-Reliable Low-Latency Communication (URLLC).

The present disclosure relate to fallback from the 2-step RA procedure to the 4-step RA procedure.

For NR unlicensed spectrum, NR standalone scenario was the newly defined scenario. For this scenario, the existing RACH procedure and scheduling procedure must be enhanced to ensure differentiated latency requirements considering the LBT impact.

Figure 10:
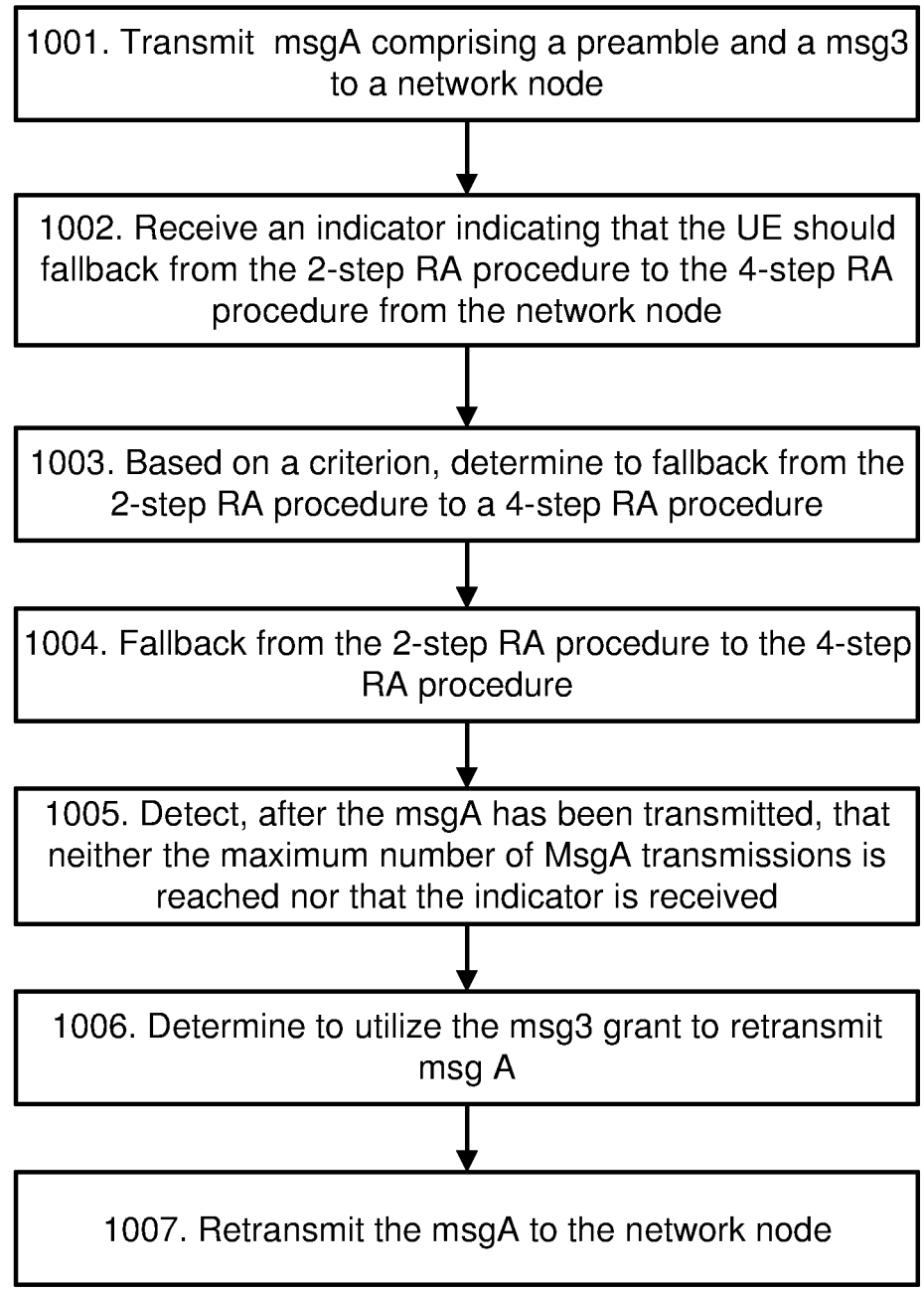
FIG. 10 is a flow chart illustrating a method performed by a UE.

The method described above will now be described seen from the perspective of the UE 101. FIG. 10 is a flowchart describing the present method performed by the UE 101 for handling 2-step and 4-step RA procedures in a communications system 100. The UE 101 may be adapted to access a licensed and/or unlicensed spectrum in the communications system 100, e.g. a NR communications system. The communications system 100 may be a 2G system, a 3G system, a 4G system, a 5G system or any other legacy or future system.

The method comprises at least one of the following steps to be performed by the UE 101, which steps may be performed in any suitable order than described below:

Step 1001

This step corresponds to step 401 in FIG. 4. The UE 101 transmits a msgA comprising a preamble and a msg3 to a network node 103. The UE 101 applies a 2-step RA procedure when transmitting msgA. Msg3 may be referred to as payload.

Step 1002

This step corresponds to step 405 in FIG. 4. The UE 101 may receive an indicator indicating that the UE 101 should fallback from the 2-step RA procedure to the 4-step RA procedure from the network node 103.

The indicator may be a one-bit field where the value 1 indicates fallback from the 2-step RA procedure to the 4-step RA and where the value 0 indicates retransmission of msgA.

The indicator may be a one-bit field where the value 0 indicates fallback from the 2-step RA procedure to the 4-step RA procedure and where the value 1 indicates retransmission of msgA.

The indicator may be a reused R bit in a RAR MAC subheader or a payload section.

The indicator may be one or two BIs comprised in a MAC subheader of a RAR MAC PDU received by the UE 101.

The indicator may be a fallback indicator.

Step 1003

This step corresponds to step 406 in FIG. 4. Based on a criterion, the UE 101 determines to fallback from the 2-step RA procedure to a 4-step RA procedure. The criterion is that a maximum number of msgA transmissions has been exceeded or receipt of the indicator indicating that the UE 101 should fallback from the 2-step RA procedure to the 4-step RA procedure.

The criterion for the decision to fallback from 2-step RA procedure to the 4-step RA procedure may be further based on a priority of random access.

The criterion may be associated with a timer.

The UE 101 may determine to fallback from the 2-step RA procedure to the 4-step RA procedure when the UE 101 has not received any RAR comprising a RA preamble identifier that matches a preamble index comprised in the transmitted msgA when the timer is expired.

The criterion may be configured by and received from the network node 103, or the criterion may be obtained or determined by the UE 101.

When the criterion has been fulfilled, the UE 101 may determine to fallback form the 2-step RA procedure to the 4-step RA procedure.

Step 1004

This step corresponds to step 407 in FIG. 4. The UE 101 may fallback from the 2-step RA procedure to the 4-step RA procedure. This step is based on the determination in step 1003.

Step 1005

This step corresponds to step 403 in FIG. 4. The UE 101 may detect, after the msgA has been transmitted, that neither the maximum number of MsgA transmissions is reached nor that the indicator is received. In other words, the UE 101 may detect that the criterion is not fulfilled.

Step 1006

This step corresponds to step 406 in FIG. 4. Based on the detection in step 1003, the UE 101 may determine to utilize the msg3 grant to retransmit msg A. Thus, the UE 101 may determine to retransmit msgA when neither the maximum number of MsgA transmissions is reached nor that the indicator is received.

Step 1007

This step corresponds to step 408 in FIG. 4. The UE 101 may retransmit the msgA to the network node 103. The UE 101 may apply the 2-step RA procedure when retransmitting msgA.

Figure 11:
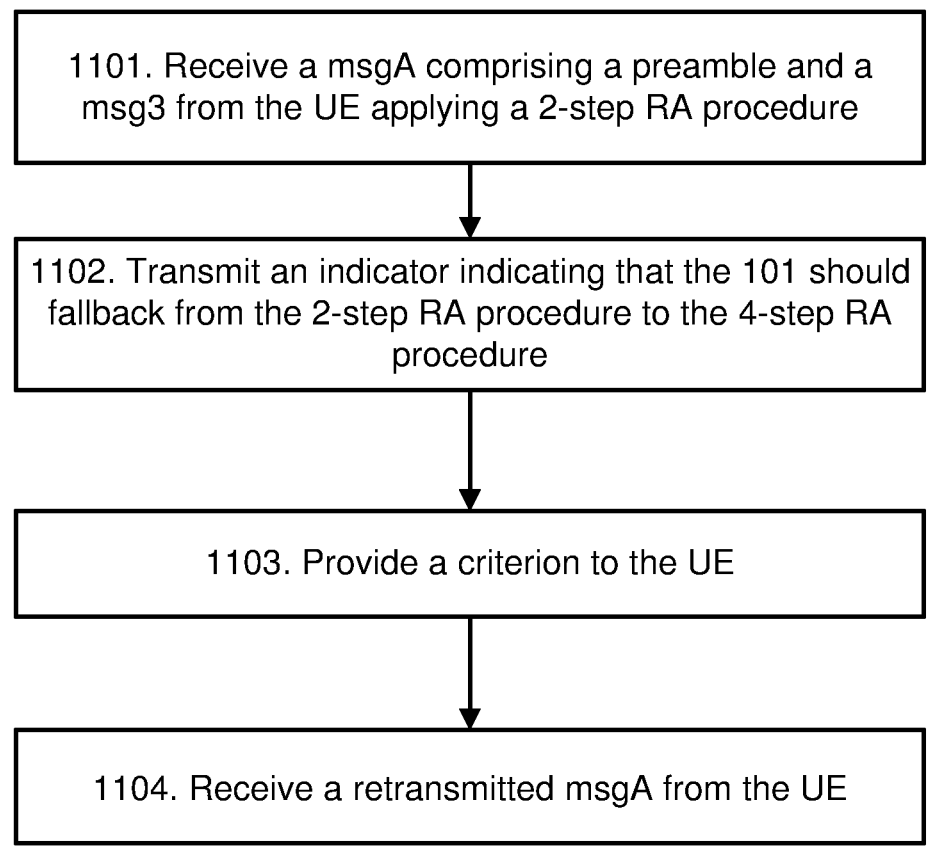
FIG. 11 is a flow chart illustrating a method performed by a network node.

The method described above will now be described seen from the perspective of the network node 103. FIG. 11 is a flowchart describing the present method performed by the network node 103 for handling 2-step and 4-step RA procedures in a communications system 100. The communications system 100 may be a 2G system, a 3G system, a 4G system, a 5G system or any other legacy or future system. The network node 103 may be an eNB, a gNB, etc. The method comprises at least one of the following steps to be performed by the network node 103, which steps may be performed in any suitable order than described below:

Step 1101

This step corresponds to step 401 in FIG. 4. The network node 103 receives a msgA comprising a preamble and a msg3 from the UE 101 applying a 2-step RA procedure. Msg3 may be referred to as payload.

Step 1102

This step corresponds to step 405 in FIG. 4. The network node 103 may transmit, to the UE 101, an indicator indicating that the UE 101 should fallback from the 2-step RA procedure to the 4-step RA procedure. The indicator may be a fallback indicator.

The indicator may be a one-bit field where the value 1 indicates fallback from the 2-step RA procedure to the 4-step RA procedure and where the value 0 indicates retransmission of msgA.

The indicator may be a one-bit field where the value 0 indicates fallback from the 2-step RA procedure to the 4-step RA procedure and where the value 1 indicates retransmission of msgA.

The indicator may be a reused R bit in the RAR MAC subheader or a payload section.

The indicator may be one or two BIs comprised in a MAC subheader of a RAR MAC PDU.

Step 1103

The network node 103 may provide a criterion to the UE 101. The criterion may be to be used by the UE 101 in a decision to fallback from the 2-step RA procedure to a 4-step RA procedure and/or to retransmit msgA.

The criterion may be that a maximum number of msgA transmissions have been exceeded or receipt of an indicator indicating that the UE 101 should fallback from the 2-step RA procedure to the 4-step RA procedure.

The criterion may be associated with a timer.

The criterion may be associated with the transmitted indicator from step 1102.

The criterion may be configured by and transmitted by the network node 103 to the UE 101.

Step 1104

This step corresponds to step 408 in FIG. 4. The network node 103 may receive a retransmitted msgA from the UE 101. The retransmitted msgA may be received with the criterion has not been fulfilled.

Figure 12A:
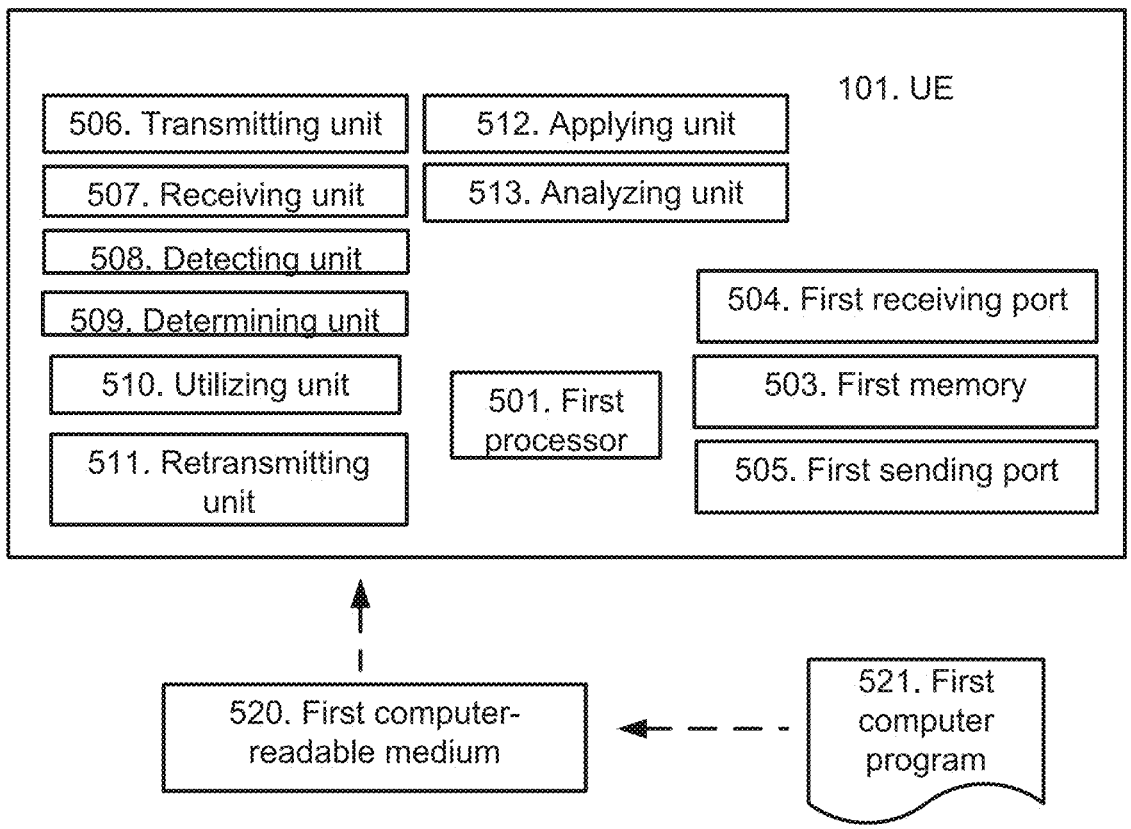
FIG. 12A is a schematic drawing illustrating a UE.
Figure 12B:
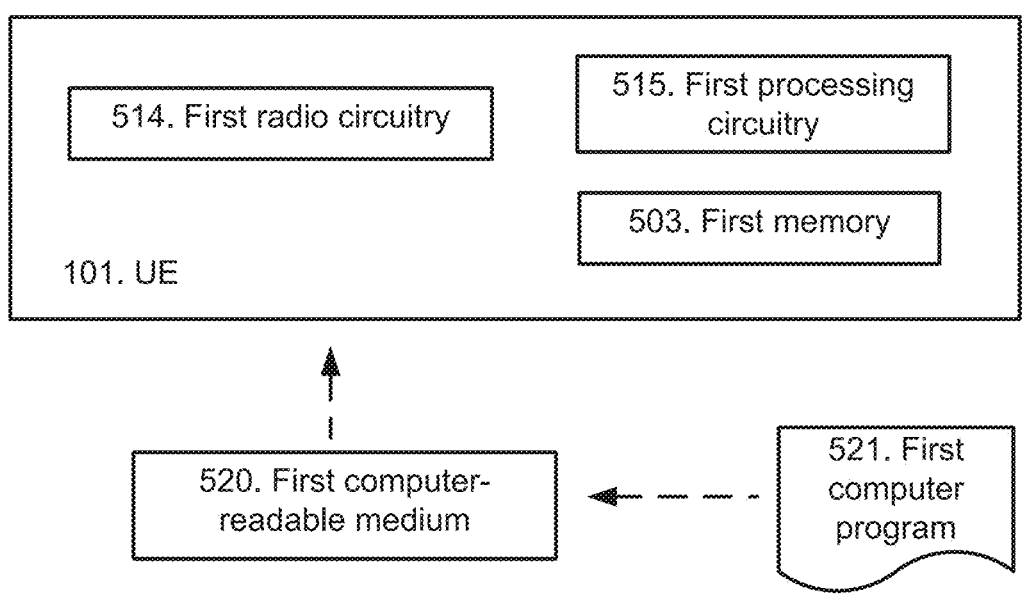
FIG. 12B is a schematic drawing illustrating a UE.

FIG. 12A and FIG. 12B depict two different arrangements of an UE 101 in panels a) and b), respectively. The UE 101 may comprise the following arrangement depicted in FIG. 12A.

The present disclosure in the UE 101 may be implemented through one or more processors, such as a first processor 501 in the UE 101 depicted in FIG. 12A, together with computer program code for performing the functions and actions described herein. A processor, as used herein, may be understood to be a hardware component. The program code mentioned above may also be provided as a computer program product, for instance in the form of a data carrier carrying computer program code for performing the present disclosure when being loaded into the UE 101. One such carrier may be in the form of a CD ROM disc. It is however feasible with other data carriers such as a memory stick. The computer program code may furthermore be provided as pure program code on a server and downloaded to the UE 101.

The UE 101 may further comprise a first memory 503 comprising one or more memory units. The memory 503 is arranged to be used to store obtained information, store data, configurations, schedulings, and applications etc. to perform the methods herein when being executed in the UE 101.

The UE 101 may receive information from, e.g. the network node 103, through a first receiving port 504. The first receiving port 504 may be connected to one or more antennas in UE 101. The UE 101 may receive information from another structure in the communications system 100 through the first receiving port 504. Since the first receiving port 504 may be in communication with the first processor 501, the first receiving port 504 may then send the received information to the first processor 501. The first receiving port 504 may also be configured to receive other information.

The first processor 501 in the UE 101 may be further configured to transmit or send information to e.g. network node 103, or another structure in the communications system 100, through a first sending port 505, which may be in communication with the first processor 510, and the first memory 503.

The UE 101 may be adapted to, e.g. by means of a transmitting unit 506, transmit a msgA comprising a preamble and a msg3 to a network node 103.

The UE 101 may be adapted to, e.g. by means of a receiving unit 507, receive a msg3 grant from the network node 103.

The UE 101 may be adapted to, e.g. by means of a detecting unit 508, detect that the msg3 grant has been received after the msgA has been transmitted.

The UE 101 may be adapted to, e.g. by means of a determining unit 509, based on a criterion, determine to utilize the msg3 grant/fallback from the 2-step RA procedure to the 4-step RA procedure and/or to retransmit msgA.

The UE 101 may be adapted to, e.g. by means of a utilizing unit 510, utilize the msg3 grant/fallback from the 2-step RA procedure to the 4-step RA procedure.

The UE 101 may be adapted to, e.g. by means of a retransmitting unit 511, retransmit the msgA to the network node 103.

The UE may be adapted to, e.g. by means of an applying unit 512, apply a 2-step RA procedure when transmitting or retransmitting msgA. The UE 101 may be adapted to apply a 4-step RA procedure when utilizing the msg3 grant.

The UE 101 may be adapted to, e.g. by means of an analyzing unit 512, analyze timing of the msg3 grant in relation to timing of the next 2-step RA occasion. The criterion for the decision to utilize the msg3 grant or to retransmit msgA may be based on a result of the analysis.

The criterion for the decision to utilize the msg3 grant or to retransmit msgA may be further based on a priority of random access.

Both the msg3 grant may be utilized and the msgA may be retransmitted when no new msgB is received from the network node 103 between the transmissions.

The UE 101 may be adapted to, e.g. by means of the retransmitting unit 511, retransmit msgA comprising an indicator of that msgA is linked to the msg3 grant, i.e. that msgA and the msg3 grant is belongs to the same UE 101.

The UE 101 may be adapted to, e.g. by means of the transmitting unit 506, transmit a MAC PDU comprising MAC CEs and/or data using the msg3 grant to the network node 103.

The criterion may be associated with a maximum number of msgA transmissions which the UE 101 is allowed to perform. The UE 101 may be adapted to, e.g. by means of the determining unit 509, determine to fallback from the 2-step RA procedure to the 4-step RA procedure when the maximum number of preamble transmissions has been exceeded.

The criterion may be associated with a timer. The UE 101 may be adapted to, e.g. by means of the determining unit 509, determine to fallback from the 2-step RA procedure to the 4-step RA procedure when the UE 101 has not received any msg3/RAR comprising a RAPID that matches a preamble index comprised in the transmitted msgA when the timer is expired.

The UE 101 may be adapted to, e.g. by means of the receiving unit 507, receive an indicator indicating that the UE 101 should utilize the msg3 grant from the network node 103. The criterion may be associated with the received indicator. The UE 101 may be adapted to, e.g. by means of the determining unit 509, determine to utilize the msg3 grant/fallback from the 2-step RA procedure to the 4-step RA procedure when it has received the indicator.

The indicator may be a one-bit field where the value 1 indicates utilization of msg3 grant/fallback from the 2-step RA procedure to the 4-step RA procedure and where the value 0 indicates retransmission of msgA.

The indicator may be a one-bit field where the value 0 indicates utilization of the msg3 grant/fallback from the 2-step RA procedure to the 4-step RA procedure and where the value 1 indicates retransmission of msgA.

The indicator may be a reused R bit in the RAR MAC subheader or the payload section.

The indicator may be one or two Bls comprised in a MAC subheader of a RAR MAC PDU received by the UE 101.

The criterion may be associated with a UL grant and/or an indicator comprised in msg3/RAR. The presence of the UL grant in the msg3 may indicate that the UE 101 shall utilize the msg3 grant. The presence of the UL grant and an indicator may indicate that the UE 101 shall utilize the msg3 grant. No UL grant but the presence of an indicator may indicate that the UE 101 shall retransmit msgA.

The UE 101 may be adapted to access a licensed and/or unlicensed spectrum in a communications system 100, e.g. a NR communications system.

The criterion may be configured by or received from the network node 103, or the criterion is obtained or determined by the UE 101.

The communications system 100 may be a 2G system, a 3G system, a 4G system, a 5G system or any other legacy or future system.

Those skilled in the art will also appreciate that the transmitting unit 506, the receiving unit 507, the detecting unit 508, the determining unit 509, the utilizing unit 510, the retransmitting unit 511, the applying unit 512, the analysing unit 513 described above may refer to a combination of analog and digital circuits, and/or one or more processors configured with software and/or firmware, e.g., stored in memory, that, when executed by the one or more processors such as the first processor 501, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

The different units 506-513 described above may be implemented as one or more applications running on one or more processors such as the first processor 501.

Thus, the methods herein for the UE 101 may be respectively implemented by means of a first computer program 521 product, comprising instructions, i.e., software code portions, which, when executed on at least one first processor 501, cause the at least one first processor 501 to carry out the actions described herein, as performed by the UE 101. The first computer program 521 product may be stored on a first computer-readable storage medium 520. The first computer-readable storage medium 520, having stored thereon the first computer program 521, may comprise instructions which, when executed on at least one first processor 501, cause the at least one first processor 501 to carry out the actions described herein, as performed by the UE 101. The first computer-readable storage medium 520 may be a non-transitory computer-readable storage medium, such as a CD ROM disc, or a memory stick. The first computer program 521 product may be stored on a carrier containing the first computer program 521 just described, wherein the carrier is one of an electronic signal, optical signal, radio signal, or the first computer-readable storage medium 508, as described above.

The UE 101 may comprise a communication interface configured to facilitate communications between the UE 101 and other nodes or devices, e.g., the network node 103, or another structure. The interface may, for example, include a transceiver configured to transmit and receive radio signals over an air interface in accordance with a suitable standard.

The UE 101 may comprise the following arrangement depicted in FIG. 12B. The UE 101 may comprise a first processing circuitry 515, e.g., one or more processors such as the first processor 510, in the UE 101 and the first memory 503. The UE 101 may also comprise a first radio circuitry 514, which may comprise e.g., the first receiving port 504 and the first sending port 505. The first processing circuitry 515 may be configured to, or operable to, perform the method actions according to FIGS. 1-9, in a similar manner as that described in relation to FIG. 12A. The first radio circuitry 514 may be configured to set up and maintain at least a wireless connection with the UE 101. Circuitry may be understood herein as a hardware component.

Hence, present disclosure also relate to the UE 101 operative to operate in the communications system 100. The UE 101 may comprise the first processing circuitry 511 and the first memory 503, said first memory 503 containing instructions executable by said first processing circuitry 511, whereby the UE 101 is further operative to perform the actions described herein in relation to the UE 101, e.g., in FIGS. 1-9.

Figure 13A:
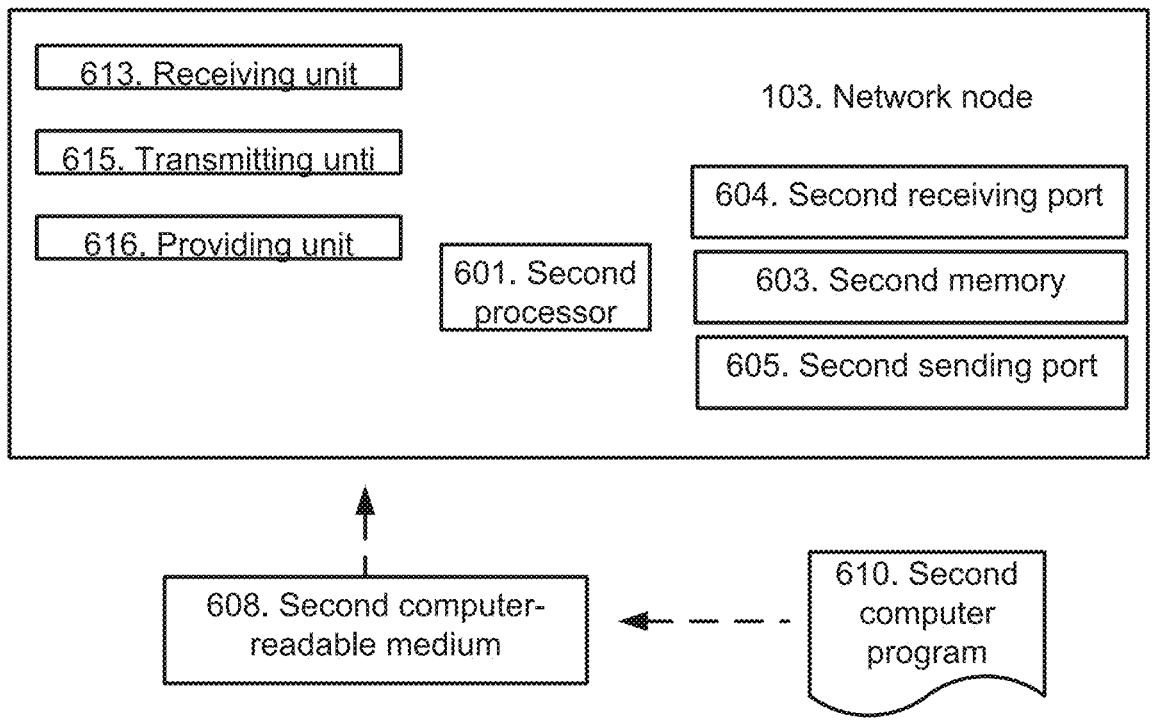
FIG. 13A is a schematic drawing illustrating a network node.
Figure 13B:
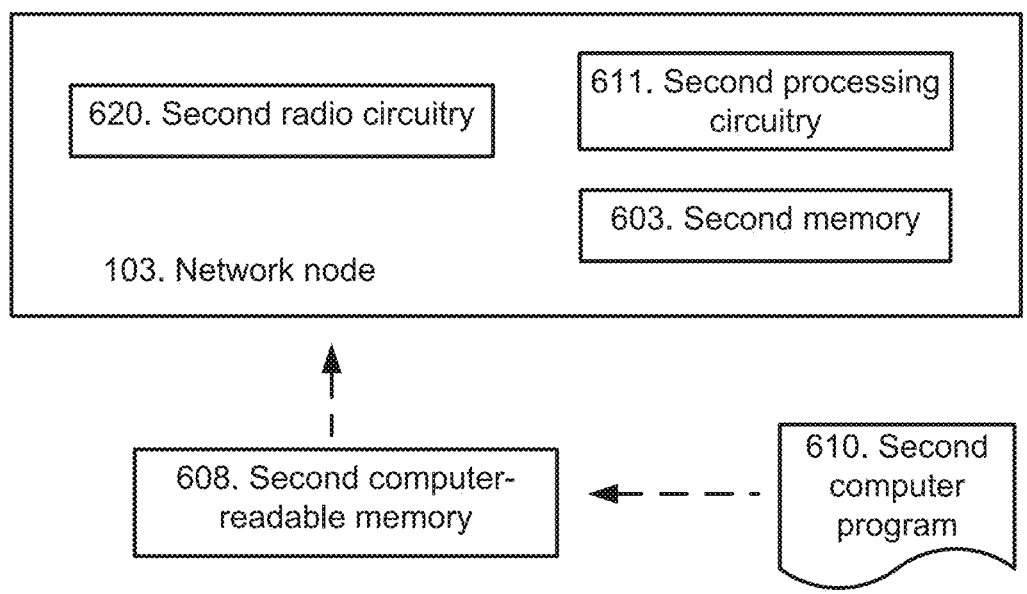
FIG. 13B is a schematic drawing illustrating a network node.

FIG. 13A and FIG. 13B depict, in panels a) and b), respectively, the arrangement that the network node 103 may comprise. The network node 105 may comprise the following arrangement depicted in FIG. 12A.

The network node 103 may be implemented through one or more processors, such as a second processor 601 in the network node 103 depicted in FIG. 13A, together with computer program code for performing the functions and actions described herein. A processor, as used herein, may be understood to be a hardware component. The program code mentioned above may also be provided as a computer program product, for instance in the form of a data carrier carrying computer program code for performing the methods described herein when being loaded into the network node 103. One such carrier may be in the form of a CD ROM disc. It is however feasible with other data carriers such as a memory stick. The computer program code may furthermore be provided as pure program code on a server and downloaded to the network node 103.

The network node 103 may further comprise a second memory 603 comprising one or more memory units. The second memory 603 is arranged to be used to store obtained information, store data, configurations, schedulings, and applications etc. to perform the methods herein when being executed in the network node 103.

The network node 103 may receive information from, e.g., the UE 101, through a second receiving port 604. The second receiving port 604 may be connected to one or more antennas in network node 103. The network node 103 may receive information from another structure in the communications system 100 through the second receiving port 604. Since the second receiving port 604 may be in communication with the second processor 601, the second receiving port 604 may then send the received information to the second processor 601. The second receiving port 604 may also be configured to receive other information.

The second processor 601 in the network node 103 may be further configured to transmit or send information to e.g., the UE 101 or another structure in the communications system 100, through a second sending port 605, which may be in communication with the second processor 601, and the second memory 603.

The network node 103 may be adapted to, e.g. by means of a receiving unit 613, receive a msgA comprising a preamble and a msg3 from a UE 101.

The network node 103 may be adapted to, e.g. by means of a transmitting unit 615, when msgA has been received, transmit a msg3 grant to the UE 101.

The network node 103 may be adapted to, e.g. by means of the receiving unit 613, receive a retransmitted msgA from the UE 101.

The network node 103 may be adapted to, e.g. by means of a providing unit 616, provide a criterion to the UE 101. The criterion may be to be used by the UE 101 in a decision to utilize the msg3 grant/fallback from the 2-step RA procedure to the 4-step RA procedure and/or to retransmit msgA.

The network node 103 may be adapted to, e.g. by means of the receiving unit 613, receive a retransmitted msgA from the UE 101. The retransmitted msgA may comprise an indicator of that msgA is linked to the msg3 grant, i.e. that msgA and the msg3 grant is belongs to the same UE 101.

The network node 103 may be adapted to, e.g. by means of the receiving unit 613, receive a MAC PDU comprising MAC CEs and/or data using the msg3 grant from the UE 101.

The criterion may be associated with a maximum number of preamble transmissions which the UE 101 is allowed to perform.

The criterion may be associated with a timer. The timer may be provided by the network node 103 to the UE 101.

The network node 103 may be adapted to, e.g. by means of a transmitting unit 615, transmit an indicator indicating that the UE 101 should utilize the msg3 grant to the UE 101. The criterion may be associated with the transmitted indicator.

The indicator may be a one-bit field where the value 1 indicates utilization of msg3 grant/fallback from the 2-step RA procedure to the 4-step RA procedure and where the value 0 indicates retransmission of msgA.

The indicator may be a one-bit field where the value 0 indicates utilization of the msg3 grant/fallback from the 2-step RA procedure to the 4-step RA procedure and where the value 1 indicates retransmission of msgA.

The indicator may be a reused R bit in the RAR MAC subheader or the payload section.

The indicator may be one or two BIs comprised in a MAC subheader of a RAR MAC PDU received by the UE 101.

The criterion may be associated with a UL grant and/or an indicator comprised in msg3/RAR. The presence of the UL grant in the msg3 may indicate that the UE 101 shall utilize the msg3 grant, and/or the presence of the UL grant and an indicator may indicate that the UE 101 shall utilize the msg3 grant, and/or no UL grant but the presence of an indicator may indicate that the UE 101 shall retransmit msgA.

The criterion may be configured by or transmitted by the network node 103 to the UE 101.

The communications system 100 may be a 2G system, a 3G system, a 4G system, a 5G system or any other legacy or future system.

The network node 103 may be an eNB, a gNB, etc.

Those skilled in the art will also appreciate that the receiving unit 613, the transmitting unit 615, the providing unit 616 etc. described above may refer to a combination of analog and digital circuits, and/or one or more processors configured with software and/or firmware, e.g., stored in memory, that, when executed by the one or more processors such as the second processor 601, perform as described above. One or more of these processors, as well as the other digital hardware, may be included in a single ASIC, or several processors and various digital hardware may be distributed among several separate components, whether individually packaged or assembled into a SoC.

Also, the different units 613-616 described above may be implemented as one or more applications running on one or more processors such as the second processor 601.

Thus, the methods described herein for the network node 103 may be respectively implemented by means of a second computer program 610 product, comprising instructions, i.e., software code portions, which, when executed on at least one second processor 601, cause the at least one second processor 601 to carry out the actions described herein, as performed by the network node 103. The second computer program 610 product may be stored on a second computer-readable storage medium 608. The computer-readable storage medium 608, having stored thereon the second computer program 610, may comprise instructions which, when executed on at least one second processor 601, cause the at least one second processor 601 to carry out the actions described herein, as performed by the network node 105. The computer-readable storage medium 610 may be a non-transitory computer-readable storage medium, such as a CD ROM disc, or a memory stick. The second computer program 610 product may be stored on a carrier containing the second computer program 610 just described, wherein the carrier is one of an electronic signal, optical signal, radio signal, or the second computer-readable storage medium 608, as described above.

The network node 103 may comprise a communication interface configured to facilitate communications between the network node 103 and other nodes or devices, e.g., the UE 101, or another structure. The interface may, for example, include a transceiver configured to transmit and receive radio signals over an air interface in accordance with a suitable standard.

The network node 103 may comprise the following arrangement depicted in FIG. 13B. The network node 103 may comprise a second processing circuitry 611, e.g., one or more processors such as the second processor 601, in the network node 103 and the second memory 603. The network node 103 may also comprise a second radio circuitry 620, which may comprise e.g., the second receiving port 604 and the second sending port 605. The second processing circuitry 611 may be configured to, or operable to, perform the method actions according to FIGS. 1-9 in a similar manner as that described in relation to FIG. 13A. The second radio circuitry 620 may be configured to set up and maintain at least a wireless connection with the network node 103. Circuitry may be understood herein as a hardware component.

Hence, the present disclosure also relate to the network node 103 operative to operate in the communications system 100. The network node 103 may comprise the second processing circuitry 611 and the second memory 603, said second memory 603 containing instructions executable by said second processing circuitry 611, whereby the network node 103 is further operative to perform the actions described herein in relation to the network node 105, e.g., in FIGS. 1-9.

Further Extensions and Variations

Telecommunication network connected via an intermediate network to a host computer.

Figure 14:
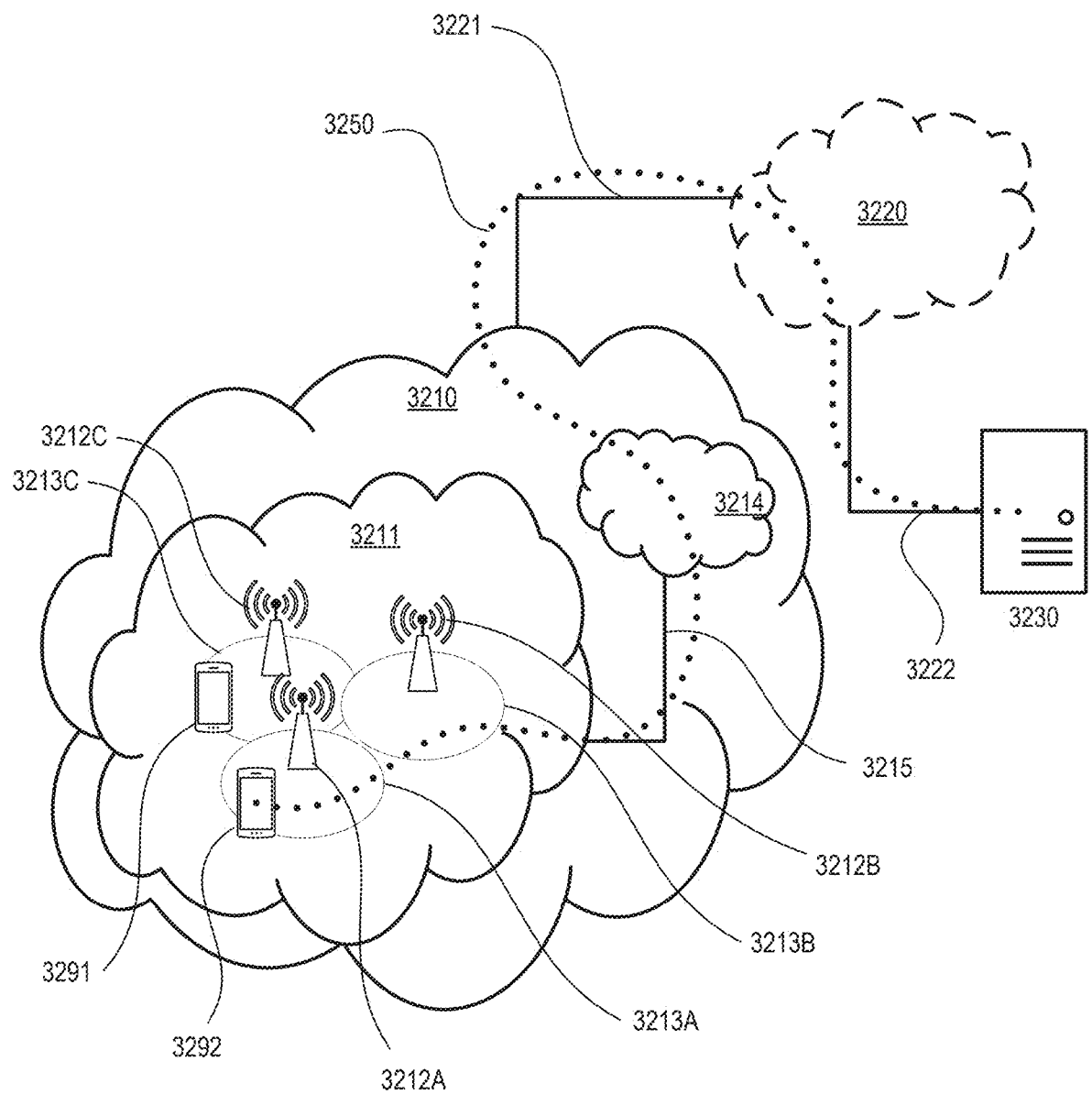
FIG. 14 is a schematic block diagram illustrating a telecommunication network connected via an intermediate network to a host computer.

With reference to FIG. 14, a communication system includes telecommunication network 3210 such as the communications system 100, for example, a 3GPP-type cellular network, which comprises access network 3211, such as a radio access network, and core network 3214. Access network 3211 comprises a plurality of network nodes 103. For example, base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A plurality of user equipments, such as the UE 101 may be comprised in the communications system 100. In FIG. 14, a first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated, the present disclosure is equally applicable to a situation where a sole UE is in the coverage area or where a sole UE is connecting to the corresponding base station 3212. Any of the UEs 3291, 3292 may be considered examples of the UE 101.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 14 as a whole enables connectivity between the connected UEs 3291, 3292 and host computer 3230. The connectivity may be described as an Over-The-Top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

In relation to FIGS. 15-19 which are described next, it may be understood that the base station may be considered an example of the network node 103.

Figure 15:
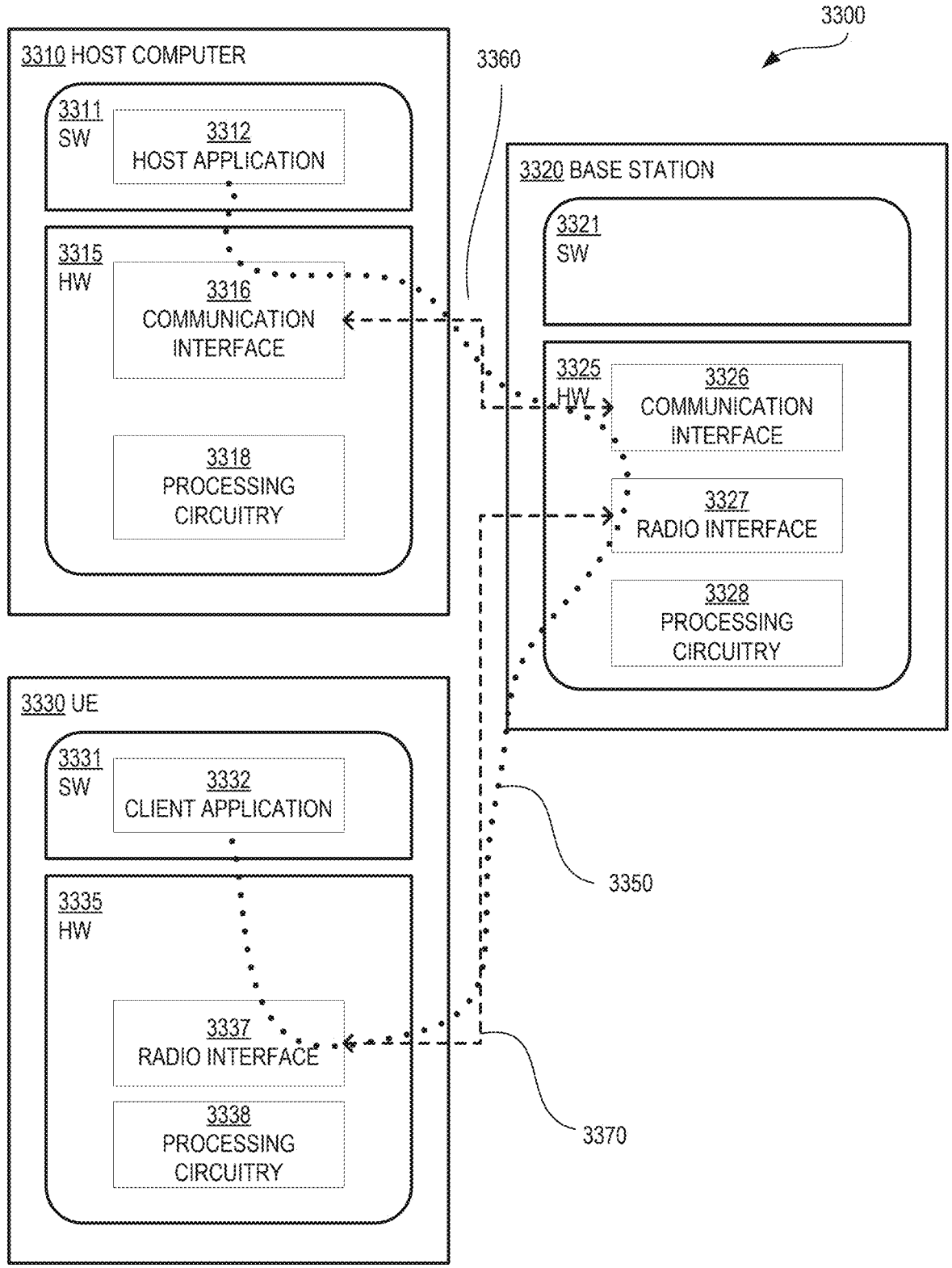
FIG. 15 is a schematic block diagram of a host computer communicating via a network node with a UE over a partially wireless connection.

FIG. 15 illustrates a host computer communicating via a network node 103 with a UE 101 over a partially wireless connection.

The UE 101 and the network node 103, e.g., a base station and host computer discussed in the preceding paragraphs will now be described with reference to FIG. 15. In communication system 3330, such as the communications system 100, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes the network node 103 exemplified in FIG. 15 as a base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with the UE 101, exemplified in FIG. 15 as a UE 3330 located in a coverage area served by base station 3320. Communication interface 3326 may be configured to facilitate connection 3360 to host computer 3310. Connection 3360 may be direct or it may pass through a core network (not shown in FIG. 15) of the telecommunication system and/or through one or more intermediate networks outside the telecommunication system. Hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. It's hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data.

Client application 3332 may interact with the user to generate the user data that it provides.

It is noted that host computer 3310, base station 3320 and UE 3330 illustrated in FIG. 15 may be similar or identical to host computer 3230, one of base stations 3212a, 3212b, 3212c and one of UEs 3291, 3292 of FIG. 14, respectively. This is to say, the inner workings of these entities may be as shown in FIG. 15 and independently, the surrounding network topology may be that of FIG. 14.

In FIG. 15, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing, e.g., on the basis of load balancing consideration or reconfiguration of the network.

Wireless connection 3370 between UE 3330 and base station 3320. The present disclosure improve the performance of OTT services provided to UE 3330 using OTT connection 3350, in which wireless connection 3370 forms the last segment. More precisely, the present disclosure may improve the spectrum efficiency, and latency, and thereby provide benefits such as reduced user waiting time, better responsiveness and extended battery lifetime.

A measurement procedure may be provided for the purpose of monitoring data rate, latency and other factors on which the present disclosure improves. There may further be optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. Sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. Measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figures 16, 17:
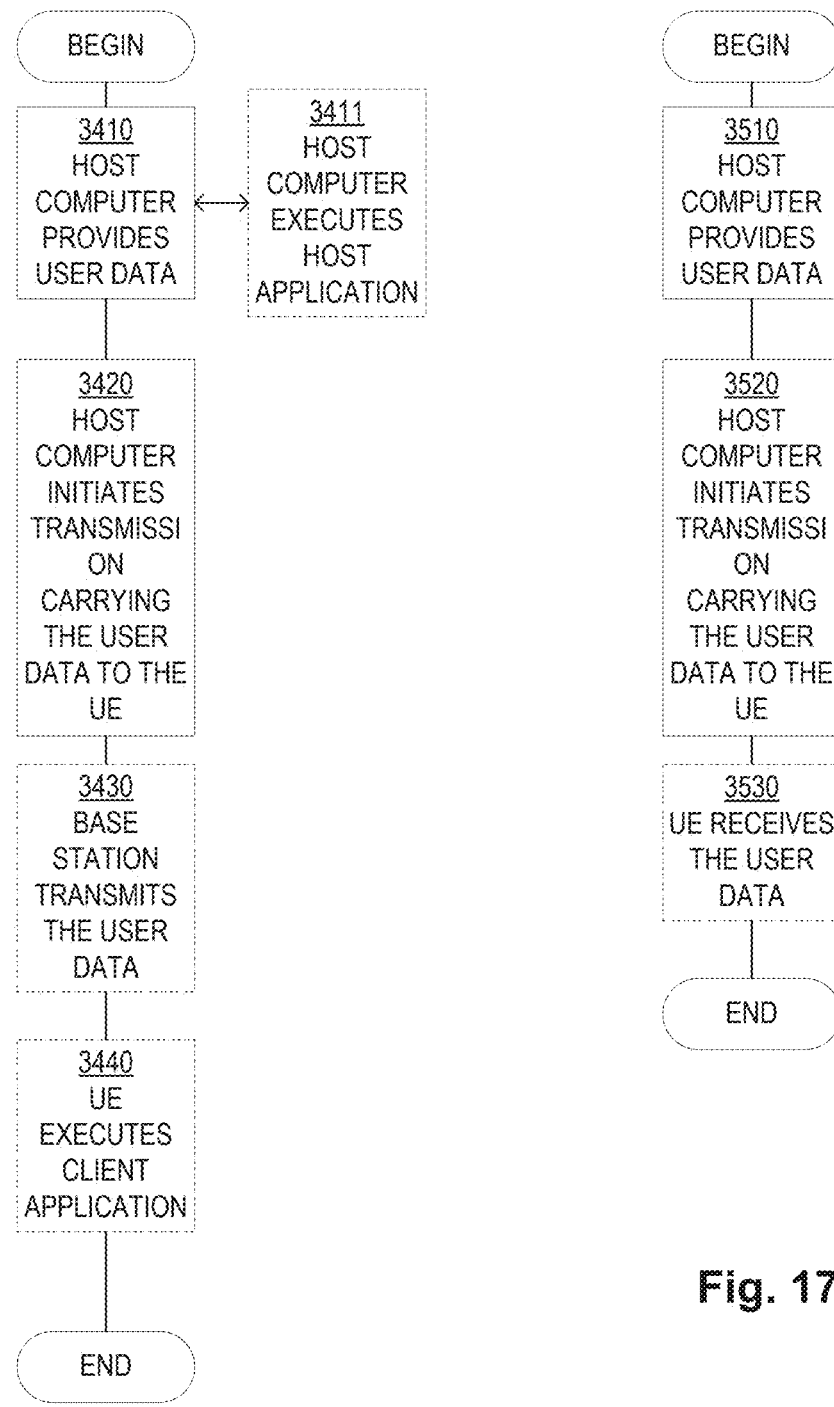
FIG. 16 is a flowchart depicting a method in a communications system including a host computer, a base station and a UE.
FIG. 17 is a flowchart depicting a method in a communications system including a host computer, a base station and a UE.

FIG. 16 illustrates methods implemented in a communication system including a host computer, a base station and a UE. FIG. 16 is a flowchart illustrating a method implemented in a communication system. The communication system includes a host computer, a base station and a UE which may be those described with reference to FIG. 14 and FIG. 15. For simplicity of the present disclosure, only drawing references to FIG. 16 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated. In step 3440 (which may also be optional), the UE executes a client application associated with the host application executed by the host computer.

FIG. 17 illustrates methods implemented in a communication system including a host computer, a base station and a UE. FIG. 17 is a flowchart illustrating a method implemented in a communication system. The communication system includes a host computer, a base station and a UE which may be those described with reference to FIG. 14 and FIG. 15. For simplicity of the present disclosure, only drawing references to FIG. 17 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station. In step 3530 (which may be optional), the UE receives the user data carried in the transmission.

Figures 18, 19:
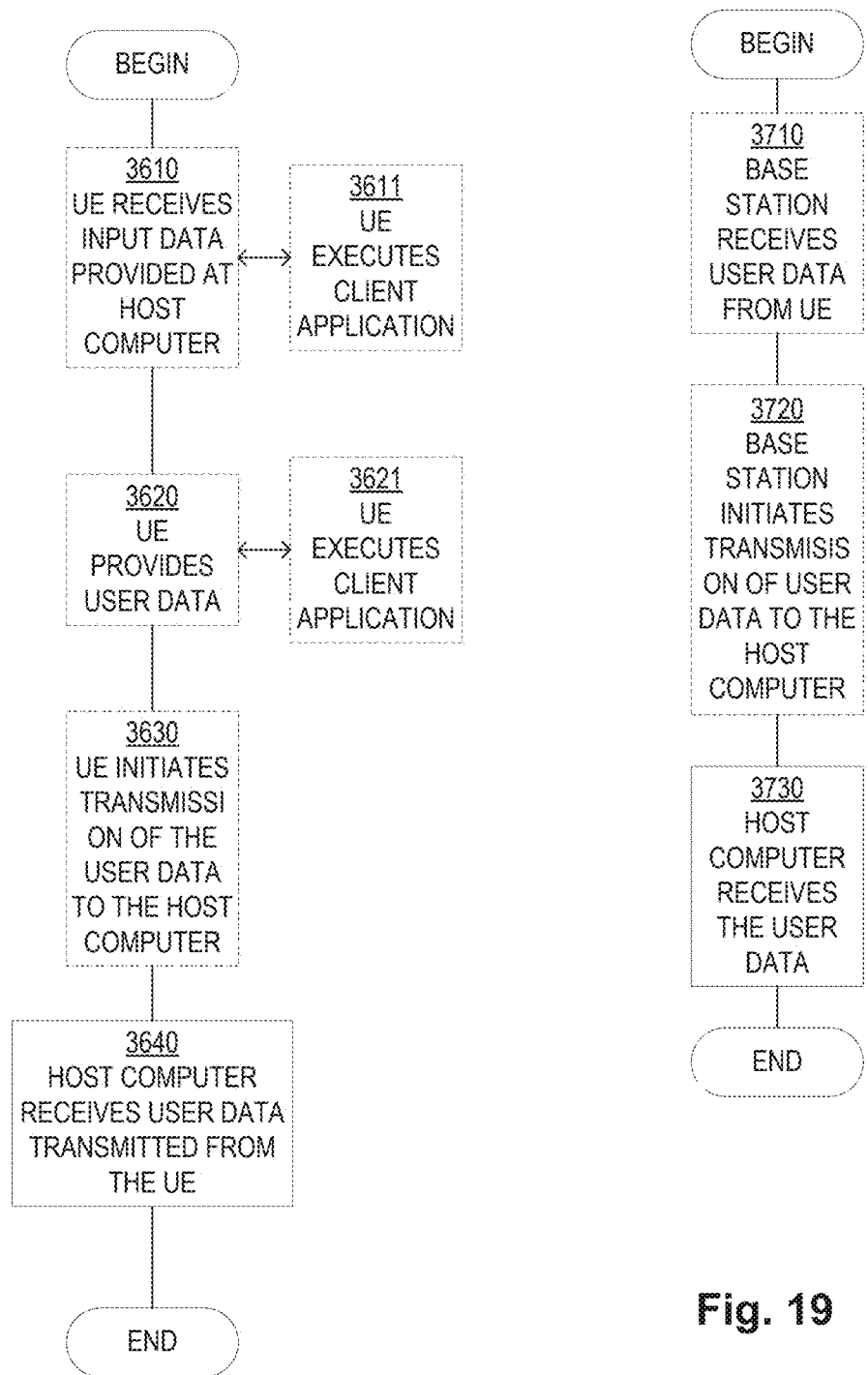
FIG. 18 is a flowchart depicting a method in a communications system including a host computer, a base station and a UE.
FIG. 19 is a flowchart depicting a method in a communications system including a host computer, a base station and a UE The drawings are not necessarily to scale and the dimensions of certain features may have been exaggerated for the sake of clarity. Emphasis is instead placed upon illustrating the principle.

FIG. 18 illustrates methods implemented in a communication system including a host computer, a base station and a UE. FIG.18 is a flowchart illustrating a method implemented in a communication system. The communication system includes a host computer, a network node 103 and a UE 101 which may be those described with reference to FIG. 14 and FIG. 15. For simplicity of the present disclosure, only drawing references to FIG. 18 will be included in this section. In step 3610 (which may be optional), the UE 101 receives input data provided by the host computer. Additionally or alternatively, in step 3620, the UE 101 provides user data. In substep 3621 (which may be optional) of step 3620, the UE 101 provides the user data by executing a client application. In substep 3611 (which may be optional) of step 3610, the UE 101 executes a client application which provides the user data in reaction to the received input data provided by the host computer. In providing the user data, the executed client application may further consider user input received from the user. Regardless of the specific manner in which the user data was provided, the UE 101 initiates, in substep 3630 (which may be optional), transmission of the user data to the host computer. In step 3640 of the method, the host computer receives the user data transmitted from the UE 101.

FIG. 19 illustrates methods implemented in a communication system including a host computer, a base station and a UE. FIG. 19 is a flowchart illustrating a method implemented in a communication system. The communication system includes a host computer, a base station and a UE which may be those described with reference to FIG. 14 and FIG. 15. For simplicity of the present disclosure, only drawing references to FIG. 19 will be included in this section. In step 3710 (which may be optional), the base station receives user data from the UE. In step 3720 (which may be optional), the base station initiates transmission of the received user data to the host computer. In step 3730 (which may be optional), the host computer receives the user data carried in the transmission initiated by the base station.

The present disclosure may be summarized as follows:

A base station configured to communicate with a UE 101, the base station comprising a radio interface and processing circuitry configured to perform one or more of the actions described herein as performed by the network node 103.

A communication system 100 including a host computer comprising:
- processing circuitry configured to provide user data; and
- a communication interface configured to forward the user data to a cellular network for transmission to a UE 101, wherein the cellular network comprises a network node 103 having a radio interface and processing circuitry, the base station's processing circuitry configured to perform one or more of the actions described herein as performed by the network node 103.

The communication system 100 may further including the network node 103.

The communication system 100 may further include the UE 101, wherein the UE 101 is configured to communicate with the network node 103.

The communication system 100, wherein:
- the processing circuitry of the host computer is configured to execute a host application, thereby providing the user data; and
- the UE 101 comprises processing circuitry configured to execute a client application associated with the host application.

A method implemented in a network node 103, comprising one or more of the actions described herein as performed by the network node 103.

A method implemented in a communication system 100 including a host computer, a base station and a UE 101, the method comprising:
- at the host computer, providing user data; and
- at the host computer, initiating a transmission carrying the user data to the UE 101 via a cellular network comprising the network node 103, wherein the network node 103 performs one or more of the actions described herein as performed by the network node 103.

The method may further comprise:
- at the network node 103, transmitting the user data.

The user data may be provided at the host computer by executing a host application, and the method may further comprise:
- at the UE 101, executing a client application associated with the host application.

A UE 101 configured to communicate with a network node 103, the UE 101 comprising a radio interface and processing circuitry configured to perform one or more of the actions described herein as performed by the UE 101.

A communication system 100 including a host computer comprising:
- processing circuitry configured to provide user data; and
- a communication interface configured to forward user data to a cellular network for transmission to a UE 101, wherein the UE 101 comprises a radio interface and processing circuitry, the UE's processing circuitry configured to perform one or more of the actions described herein as performed by the UE 101.

The communication system 100 may further including the UE 101.

The communication system 100, wherein the cellular network further includes a network node 103 configured to communicate with the UE 101.

The communication system 100, wherein:
the processing circuitry of the host computer is configured to execute a host application, thereby providing the user data; and
the UE's processing circuitry is configured to execute a client application associated with the host application.

A method implemented in a UE 101, comprising one or more of the actions described herein as performed by the UE 101.

A method implemented in a communication system 100 including a host computer, a network node 103 and a UE 101, the method comprising:
at the host computer, providing user data; and
at the host computer, initiating a transmission carrying the user data to the UE 101 via a cellular network comprising the base station, wherein the UE 101 performs one or more of the actions described herein as performed by the UE 101.

The method may further comprise:
at the UE 101, receiving the user data from the network node 103.

A UE 101 configured to communicate with a network node 103, the UE 101 comprising a radio interface and processing circuitry configured to perform one or more of the actions described herein as performed by the UE 101.

A communication system 100 including a host computer comprising:
a communication interface configured to receive user data originating from a transmission from a UE 101 to a network node 103,
wherein the UE 101 comprises a radio interface and processing circuitry, the UE's processing circuitry configured to: perform one or more of the actions described herein as performed by the UE 101.

The communication system 100 may further include the UE 101.

The communication system 100 may further include the network node 103, wherein the network node 103 comprises a radio interface configured to communicate with the UE 101 and a communication interface configured to forward to the host computer the user data carried by a transmission from the UE 101 to the base station.

The communication system 100, wherein:
the processing circuitry of the host computer is configured to execute a host application; and
the UE's processing circuitry is configured to execute a client application associated with the host application, thereby providing the user data.

The communication system 100, wherein:
the processing circuitry of the host computer is configured to execute a host application, thereby providing request data; and
the UE's processing circuitry is configured to execute a client application associated with the host application, thereby providing the user data in response to the request data.

A method implemented in a UE 101, comprising one or more of the actions described herein as performed by the UE 101.

The method may further comprise:
providing user data; and
forwarding the user data to a host computer via the transmission to the network node 103.

A method implemented in a communication system 100 including a host computer, a network node 103 and a UE 101, the method comprising:
at the host computer, receiving user data transmitted to the network node 103 from the UE 101, wherein the UE 101 performs one or more of the actions described herein as performed by the UE 101.

The method may further comprise:
at the UE 101, providing the user data to the network node 103.

The method may further comprise:
at the UE 101, executing a client application, thereby providing the user data to be transmitted; and
at the host computer, executing a host application associated with the client application.

The method may further comprise:
at the UE 101, executing a client application; and
at the UE 101, receiving input data to the client application, the input data being provided at the host computer by executing a host application associated with the client application,
wherein the user data to be transmitted is provided by the client application in response to the input data.

A network node 103 configured to communicate with a UE 101, the network node 103 comprising a radio interface and processing circuitry configured to perform one or more of the actions described herein as performed by the network node 103.

A communication system 100 including a host computer comprising a communication interface configured to receive user data originating from a transmission from a UE 101 to a base station, wherein the network node 103 comprises a radio interface and processing circuitry, the base station's processing circuitry configured to perform one or more of the actions described herein as performed by the network node 103.

The communication system 100 may further include the network node 103.

The communication system 100 may further include the UE 101, wherein the UE 101 is configured to communicate with the network node 103.

The communication system 100 wherein:
the processing circuitry of the host computer is configured to execute a host application;
the UE 101 is configured to execute a client application associated with the host application, thereby providing the user data to be received by the host computer.

A method implemented in a network node 103, comprising one or more of the actions described herein as performed by any of the network node 103.

A method implemented in a communication system including a host computer, a network node 103 and a UE 101, the method comprising:
at the host computer, receiving, from the network node 103, user data originating from a transmission which the base station has received from the UE 101, wherein the UE 101 performs one or more of the actions described herein as performed by the UE 101.

The method may further comprise:
at the network node 103, receiving the user data from the UE 101.

The method may further comprise:
at the network node 103, initiating a transmission of the received user data to the host computer.

The present disclosure relate to signaling for BSR reporting. The present disclosure aims to be efficient by minimizing the overhead. The present disclosure relate to a BSR format for IAB nodes.

The present disclosure relates to BSR formats enabling an efficient buffer status report even when there are many LCGs configured in an uplink backhaul link.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step.

Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description. In general, the usage of "first", "second", "third", "fourth", and/or "fifth" herein may be understood to be an arbitrary way to denote different elements or entities, and may be understood to not confer a cumulative or chronological character to the nouns they modify, unless otherwise noted, based on context.

It should be noted that the examples herein are not mutually exclusive. Components from one embodiment may be tacitly assumed to be present in another embodiment and it will be obvious to a person skilled in the art how those components may be used in the other exemplary embodiments The embodiments herein are not limited to the above described embodiments. Various alternatives, modifications and equivalents may be used. Therefore, the above embodiments should not be taken as limiting the scope of the embodiments. A feature from one embodiment may be combined with one or more features of any other embodiment.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods maybe performed in another order than the order in which they appear herein.

The invention claimed is:

1. A method performed by a User Equipment, UE, for handling 2-step and 4-step Random Access, RA, procedures in a communications system, the method comprising:
transmitting a message A, msgA, comprising a preamble and a message 3, msg3, to a network node, wherein the UE applies a 2-step RA procedure when transmitting msgA;
detecting, after the msgA has been transmitted, that neither the maximum number of msgA transmissions is reached nor that an indicator is received, wherein the indicator indicates that the UE should fallback from the 2-step RA procedure to the 4-step RA procedure;
based on the detection, determining to retransmit msgA to the network node; and
based on a criterion, determining to fallback from the 2-step RA procedure to the 4-step RA procedure, wherein the criterion is that a maximum number of msgA transmissions has been exceeded or receipt of the indicator.

2. The method according to claim 1, further comprising at least one of:
fallback from the 2-step RA procedure to the 4-step RA procedure; and
retransmitting the msgA to the network node.

3. The method according to claim 1, comprising:
based on the detection, determining to utilize the msg3 grant to retransmit msg A.

4. The method according to claim 1, wherein the criterion for the decision to fallback from the 2-step RA procedure to the 4-step RA procedure is further based on a priority of random access.

5. The method according to claim 1, wherein the criterion is associated with a timer; and
wherein the UE determines to fallback from the 2-step RA procedure to the 4-step RA procedure when the UE has not received any Random Access Channel Response, RAR, comprising a RA preamble identifier that matches a preamble index comprised in the transmitted msgA when the timer is expired.

6. The method according to claim 1, further comprising:
receiving the indicator indicating that the UE should fallback from the 2-step RA procedure to the 4-step RA procedure from the network node.

7. The method according to claim 1, wherein the indicator is a one-bit field where the value 1 indicates fallback from the 2-step RA procedure to the 4-step RA procedure and where the value 0 indicates retransmission of msgA.

8. The method according to claim 1, wherein the indicator is a one-bit field where the value 0 indicates fallback from the 2-step RA procedure to the 4-step RA procedure and where the value 1 indicates retransmission of msgA.

9. The method according to claim 1, wherein the indicator is a reused R bit in a Random Access Channel Response, RAR, Medium Access Control, MAC, subheader or a payload section.

10. The method according to claim 1, wherein the indicator is one or two Backoff Indicators, BI, comprised in a Medium Access Control, MAC, subheader of a Random Access Channel Response, RAR, MAC Protocol Data Unit, PDU, received by the UE.

11. The method according to claim 1, wherein the criterion is configured by and received from the network node; or wherein the criterion is obtained or determined by the UE.

12. A method performed by a network node for handling 2-step and 4-step Random Access, RA, procedures in a communications system, the method comprising:

receiving a message A, msgA, comprising a preamble and a message 3, msg3, from a User Equipment, UE, applying a 2-step RA procedure; and providing a criterion to the UE, wherein the criterion is to be used by the UE in a decision to retransmit msgA, and the criterion is that a maximum number of msgA transmissions has been exceeded or receipt of an indicator indicating that the UE should fallback from the 2-step RA procedure to the 4-step RA procedure.

13. The method according to claim 12, further comprising:

receiving a retransmitted msgA from the UE.

14. The method according to claim 12, wherein the criterion is associated with a timer.

15. The method according to claim 12, further comprising:

transmitting, to the UE, the indicator indicating that the UE should fallback from the 2-step RA procedure to the 4-step RA procedure; and wherein the criterion is receipt of the indicator.

16. The method according to claim 15, wherein the indicator is a one-bit field where the value 1 indicates fallback from the 2-step RA procedure to the 4-step RA procedure and where the value 0 indicates retransmission of msgA.

17. The method according to claim 15, wherein the indicator is a one-bit field where the value 0 indicates fallback from the 2-step RA procedure to the 4-step RA procedure and where the value 1 indicates retransmission of msgA.

18. The method according to claim 15, wherein the indicator is a reused R bit in the Random Access Channel Response, RAR, Medium Access Control, MAC subheader or a payload section.

19. A User Equipment, UE, for handling 2-step and 4-step Random Access, RA, procedures in a communications system, the UE being adapted to:

transmit a message A, msgA, comprising a preamble and a message 3, msg3, to a network node, wherein the UE applies a 2-step RA procedure when transmitting msgA;

detect, after the msgA has been transmitted, that neither the maximum number of msgA transmissions is reached nor that an indicator is received, wherein the indicator indicates that the UE should fallback from the 2-step RA procedure to the 4-step RA procedure;

based on the detection, determine to retransmit msgA to the network node; and to based on a criterion, determine to fallback from the 2-step RA procedure to the 4-step RA, procedure, wherein the criterion is that a maximum number of msgA transmissions has been exceeded or receipt of the indicator.

20. A network node for handling 2-step and 4-step Random Access, RA, procedures, the network node being adapted to:

receive a message A, msgA, comprising a preamble and a message 3, msg3, from a User Equipment, UE, applying a 2-step RA procedure; and to provide a criterion to the UE, wherein the criterion is to be used by the UE in a decision to retransmit msgA, and the criterion is that a maximum number of msgA transmissions has been exceeded or receipt of an indicator indicating that the UE should fallback from the 2-step RA procedure to the 4-step RA procedure.

* * * * *